United States Patent
Hill

(10) Patent No.: US 7,390,977 B2
(45) Date of Patent: Jun. 24, 2008

(54) HANGING BOX AND FACEPLATE ADAPTER

(75) Inventor: Raymond M Hill, Plainfield, IL (US)

(73) Assignee: Panduit Corp., Tinley Park, IL (US)

( * ) Notice: Subject to any disclaimer, the term of this patent is extended or adjusted under 35 U.S.C. 154(b) by 0 days.

(21) Appl. No.: 11/530,523

(22) Filed: Sep. 11, 2006

(65) Prior Publication Data

US 2007/0000683 A1 Jan. 4, 2007

Related U.S. Application Data

(63) Continuation of application No. 10/754,387, filed on Jan. 9, 2004, now Pat. No. 7,112,748.

(51) Int. Cl.
*H02B 1/40* (2006.01)
(52) U.S. Cl. .......................... 174/480; 174/481; 174/50; 174/53; 220/3.2; 220/3.3; 52/220.1
(58) Field of Classification Search .................. 174/480, 174/481, 50, 650, 53, 58, 57, 68.1, 72 A, 174/95, 101, 66, 67, 68.3, 72 R; 220/3.2, 220/3.3, 3.4, 3.5, 3.6, 3.7, 3.8, 4.02; 385/134, 385/135; 248/906; 439/535, 536; 52/220.1, 52/220.3, 220.5, 220.7
See application file for complete search history.

(56) References Cited

U.S. PATENT DOCUMENTS

| | | | |
|---|---|---|---|
| 4,952,163 A | 8/1990 | Dola et al. | |
| 5,024,614 A | 6/1991 | Dola et al. | |
| 5,086,194 A | 2/1992 | Bruinsma | |
| 5,486,650 A | 1/1996 | Yetter | |
| 5,614,695 A | 3/1997 | Benito Navazo | |
| 5,942,724 A | 8/1999 | Russo et al. | |
| 5,998,732 A | 12/1999 | Caveney et al. | |
| 6,323,421 B1 | 11/2001 | Pawson et al. | |
| 6,335,485 B1 | 1/2002 | Benito-Navazo | |
| 6,342,675 B1 * | 1/2002 | DeBartolo et al. | 174/50 |
| 6,355,880 B1 | 3/2002 | Bateson et al. | |
| 6,384,336 B1 | 5/2002 | VanderVelde et al. | |
| 6,441,307 B1 * | 8/2002 | Shotey et al. | 174/66 |
| 6,576,834 B2 | 6/2003 | Coutant et al. | |
| 6,641,092 B1 | 11/2003 | Adam et al. | |
| 6,881,083 B2 | 4/2005 | Vargas et al. | |
| 7,112,748 B2 * | 9/2006 | Hill | 174/480 |

* cited by examiner

*Primary Examiner*—Angel R Estrada
(74) *Attorney, Agent, or Firm*—Robert A. McCann; Christopher S. Clancy; Aimee E. McVady

(57) ABSTRACT

A versatile device that enables at least one receptacle to be installed in a raceway system. The versatile device includes a hanging box and a faceplate adapter. The hanging box is secured to the raceway system and the faceplate adapter is positioned over the hanging box and secured to the raceway system. The hanging box has a compartment that houses at least one receptacle and a removable divider wall that is positioned within the compartment. The faceplate adapter has a main body with an aperture for providing access to the hanging box. The main body of the faceplate adapter also has a removable section that is positioned within the aperture such that removal of the removable section expands the aperture.

14 Claims, 23 Drawing Sheets

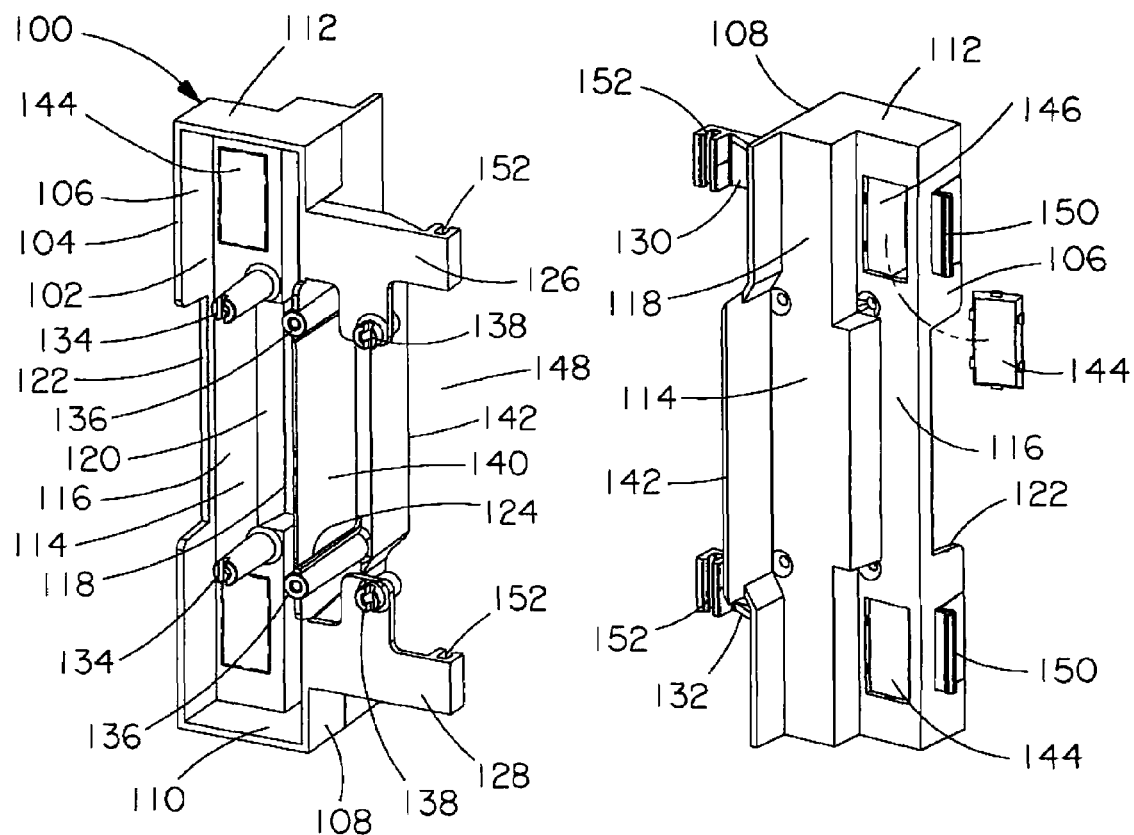
FIG.3
FIG.4
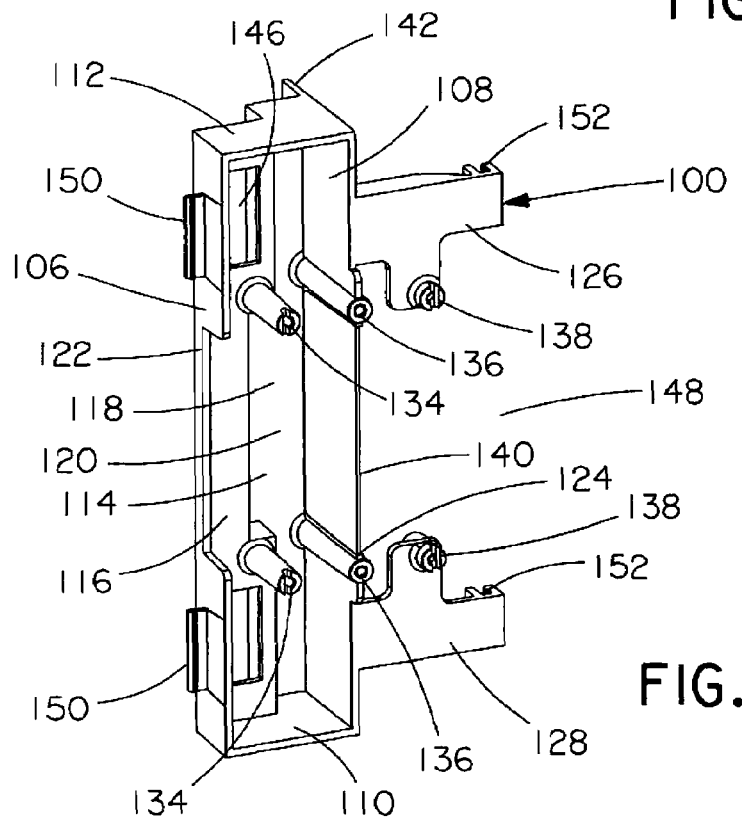
FIG.5

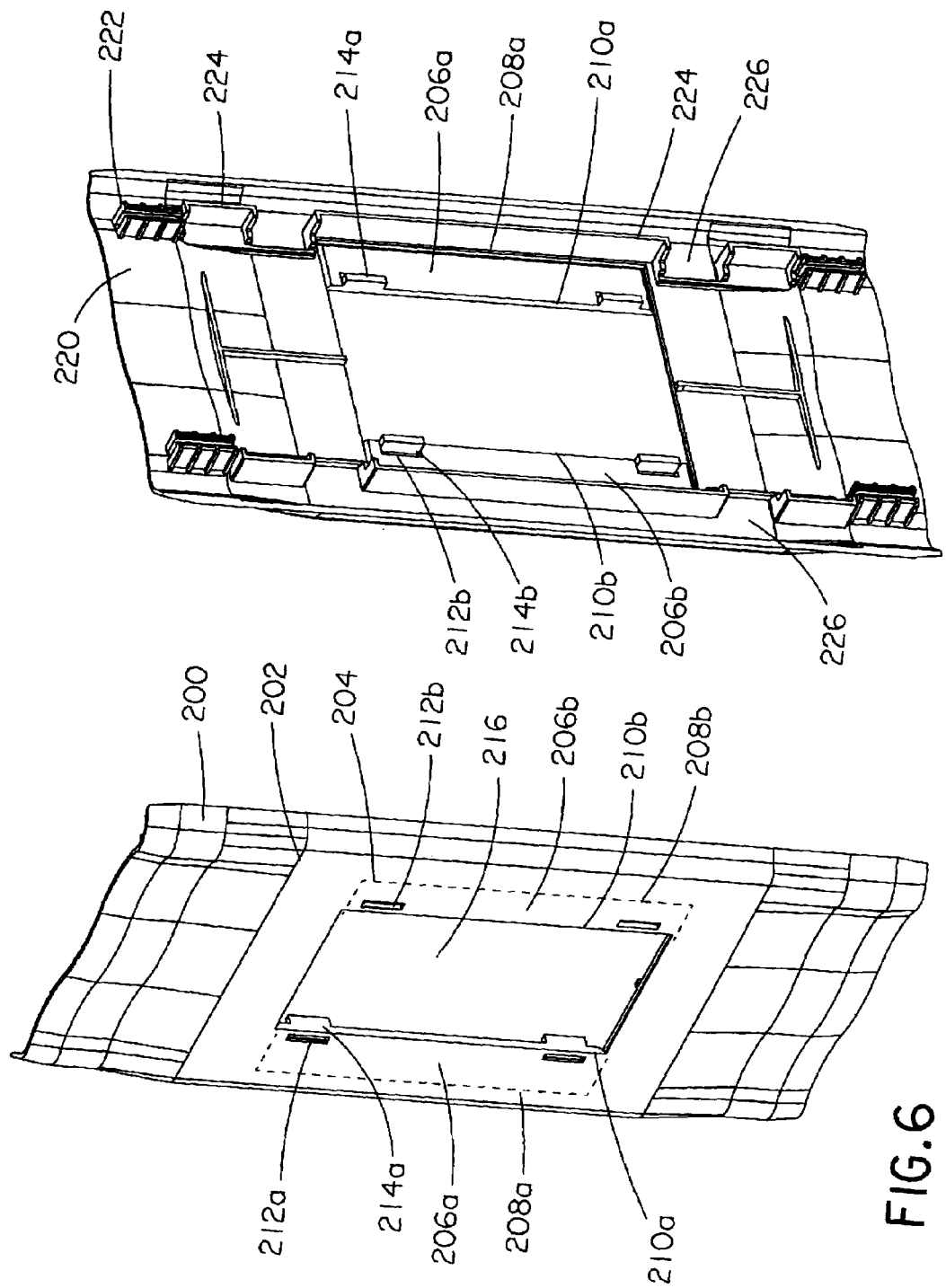

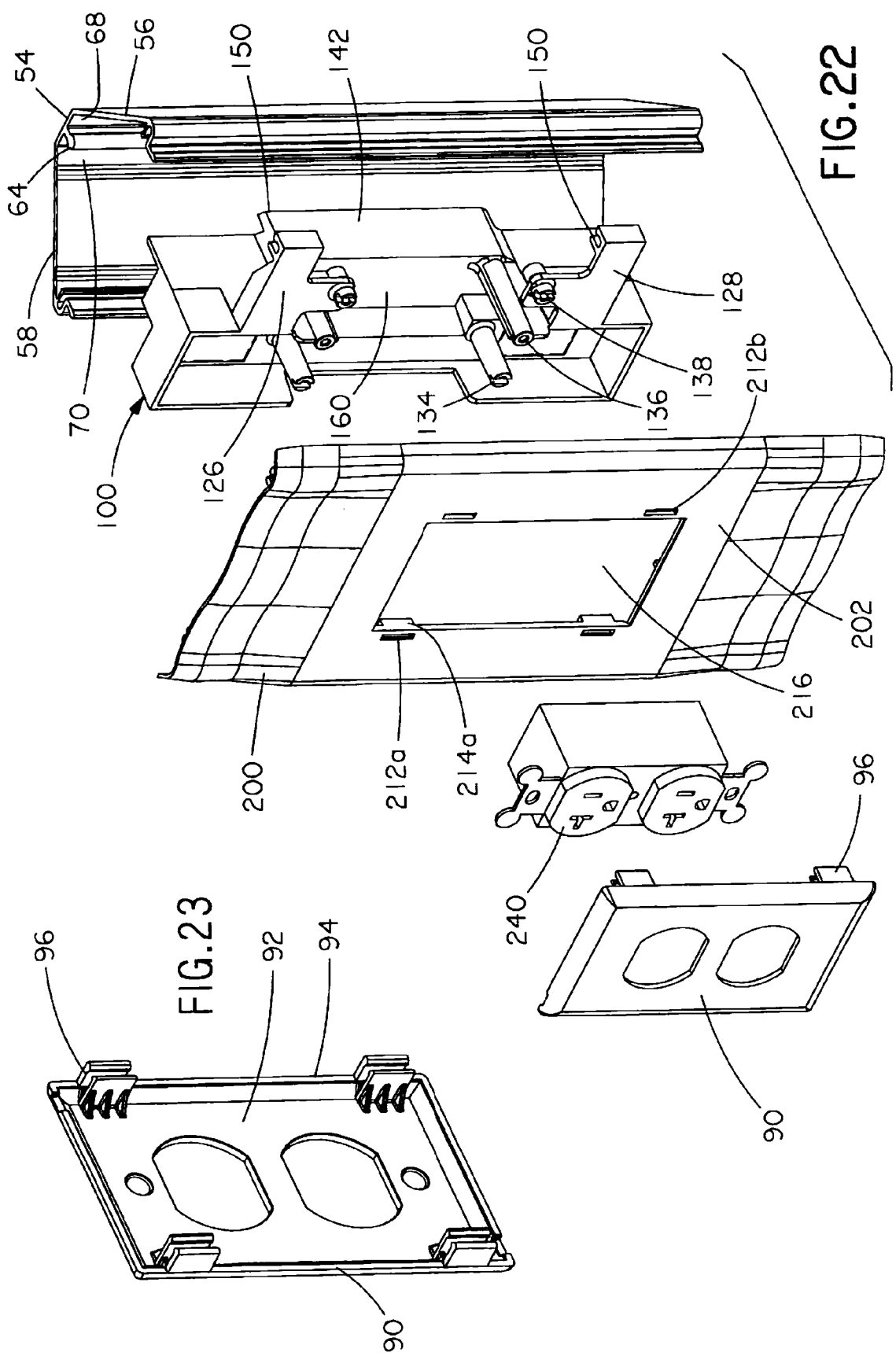

HANGING BOX AND FACEPLATE ADAPTER

CROSS-REFERENCE TO RELATED APPLICATIONS

This application is a continuation of U.S. application Ser. No. 10/754,387, filed on Jan. 9, 2004 now U.S. Pat. No. 7,112,748, the entirety of which is hereby incorporated by reference.

FIELD OF THE INVENTION

The present invention relates to a device for mounting power and communication devices in a raceway system, and more particularly, to a universal hanging box and a universal faceplate adapter that are mounted to a raceway system to enable a single or dual, power or communication receptacle to be installed in the raceway system.

BACKGROUND OF THE INVENTION

Multi-channel wiring raceway systems are common for installation of power and communication devices within the same duct. These raceway systems are usually used in an office, commercial or industrial setting where design, layout, production and seating arrangements can be changed or upgraded. If the system requires a change or modification, such as moving or installing a power or communication outlet, the system must be reconfigured. Typically, an offset power or communication box may be added to the raceway system to accommodate the modification. However, there may not be available space to position an offset box adjacent to the raceway system or it may not be cost effective to add offset boxes to accommodate the system modifications.

As such, it is desirable to provide a device that creates a versatile raceway system in which the number and location of the power and communication outlets can be easily varied throughout the system.

SUMMARY OF THE INVENTION

A first aspect of the present invention is a versatile device that enables at least one receptacle to be installed in a raceway system. The versatile device includes a hanging box secured to a raceway system and a faceplate adapter mounted over the hanging box and secured to the raceway system. The hanging box has a compartment for housing at least one receptacle and a removable divider wall positioned within the compartment for dividing the compartment to house two receptacles. The faceplate adapter has a main body with an aperture to provide access to the hanging box. The main body of the faceplate adapter also has a removable section that is positioned within the aperture such that when the removable section is removed, the aperture expands.

A second aspect of the present invention is a raceway system with a versatile device that enables at least one receptacle to be installed in the raceway system. The raceway system includes a raceway with a base, a first side wall extending upwardly from the base and a second side wall extending upwardly from the base. The raceway also includes a divider wall positioned between the first side wall and the second side wall that extends upwardly from the base. The versatile device includes a hanging box that is mounted between the first and second walls of the raceway and a faceplate adapter that is mounted over the hanging box and secured to the first and second side walls of the raceway. The hanging box has a compartment for housing at least one receptacle and a removable divider wall positioned within the compartment for dividing the compartment to house two receptacles. The faceplate adapter has a main body with an aperture to provide access to the hanging box. The main body of the faceplate adapter also has a removable section that is positioned within the aperture such that when the removable section is removed, the aperture expands. The raceway system also includes a faceplate that is mounted to the faceplate adapter to cover the at least one receptacle that is housed in the hanging box.

BRIEF DESCRIPTION OF THE DRAWINGS

FIG. 3 is a top right perspective view of the hanging box of the present invention;

FIG. 4 is a bottom perspective view of the hanging box of FIG. 3;

FIG. 5 is a top left perspective view of the hanging box of FIG. 3;

FIG. 6 is a top perspective view of the faceplate adapter of the present invention with the center section attached;

FIG. 7 is a bottom perspective view of the faceplate adapter of FIG. 6 with the center section attached;

FIG. 22 is an exploded view of the hanging box and faceplate adapter installed in the raceway system of FIG. 21;

FIG. 23 is a bottom perspective view of the faceplate to be installed in the faceplate adapter in the raceway system of FIG. 21;

DETAILED DESCRIPTION

Figure 1:
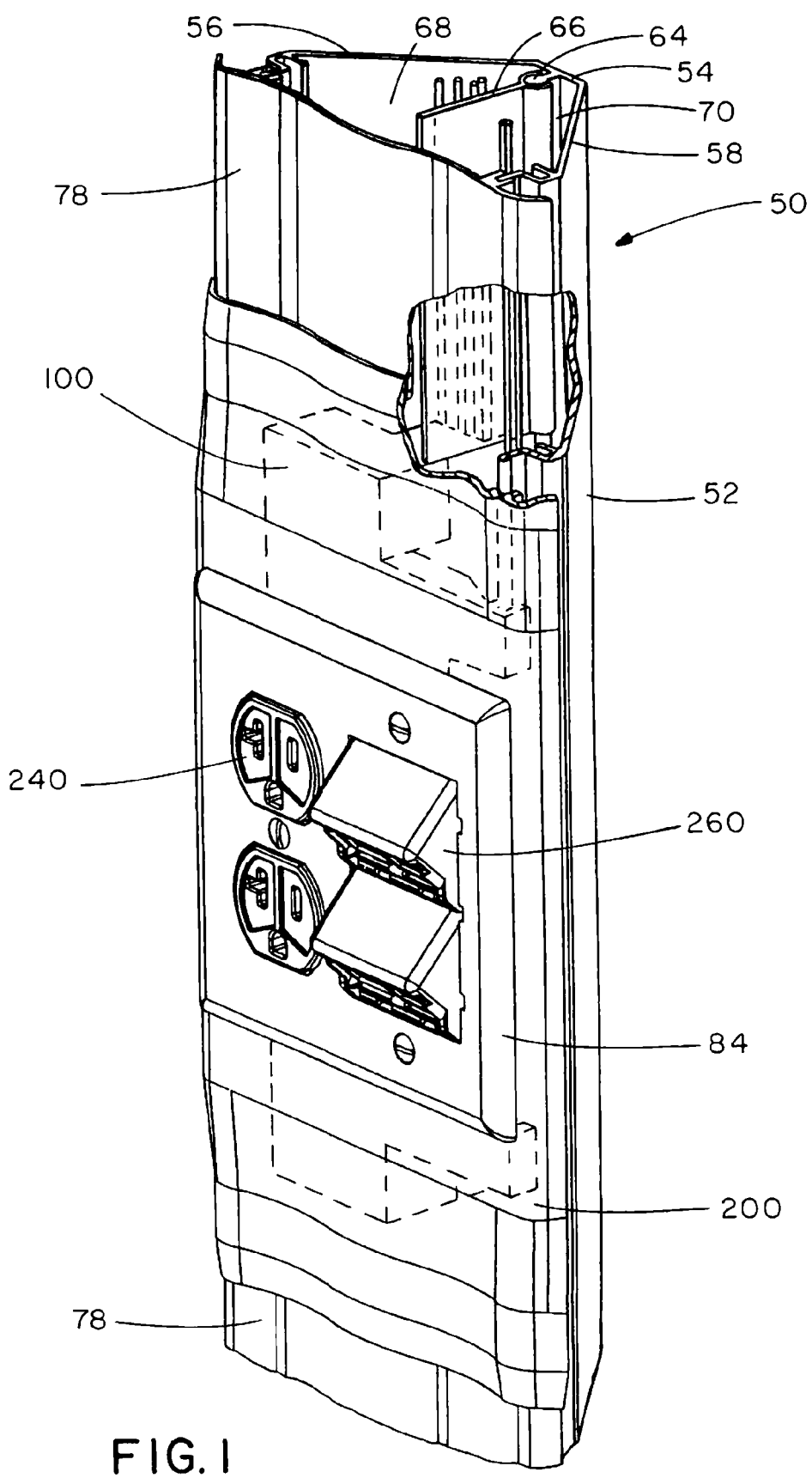
FIG. 1 is a top perspective view of one embodiment of the hanging box and faceplate adapter of the present invention installed in a raceway system configured to house two receptacles.

The present invention is directed to a universal hanging box 100 and a universal faceplate adapter 200 that are installed in a raceway system 50. The hanging box 100 and the faceplate adapter 200 work in conjunction with each other to provide a versatile device for installing multiple wiring configurations in the raceway system 50. As shown in FIGS. 1-20, the universal hanging box 100 and faceplate adapter 200 are configured to receive an electrical receptacle 240 and a communication receptacle 260. Alternatively, as shown in FIGS. 21-30, the universal hanging box 100 and faceplate adapter 200 may be configured to receive a single electrical receptacle 240.

FIG. 1 illustrates an assembled cove raceway system 50 that includes a cove raceway 52 having a base 54 and side walls 56, 58 extending upwardly and outwardly at an angle from the base 54. The base 54 includes an upwardly extending tongue 64 that is disposed along the center of the base 54. The tongue 64 extends the length of the base 54. The tongue 64 is designed to engage and support a raceway divider wall 66 enabling the raceway divider wall 66 to be disposed at the center axis of the base 54. As a result, the raceway divider wall 66 separates the raceway 52 into a discrete electrical power channel 68 and a discrete communication channel 70 as required by current industries standards. Additionally, a raceway cover 78 is mounted over the raceway 52 to cover the channels and protect the contents therein.

Figure 2:
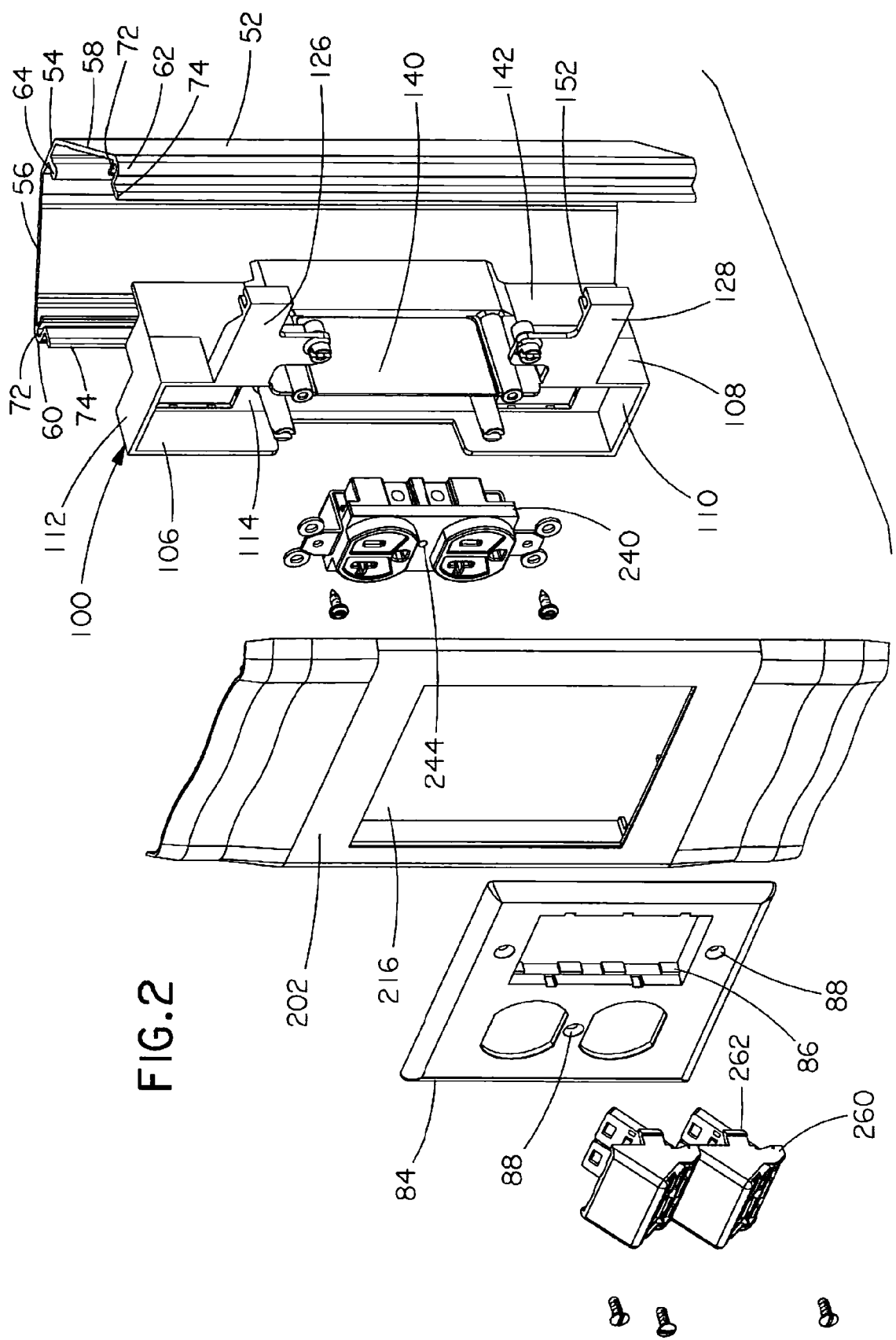
FIG. 2 is an exploded view of the hanging box and faceplate adapter installed in the raceway system of FIG. 1.

An exploded view of the assembled raceway system with the universal hanging box 100 and the faceplate adapter 200 being configured to receive two receptacles is shown in FIG. 2. The hanging box 100 is positioned within the raceway 52 so that it may be secured to a first side rail 60 located at the top of the first side wall 56 of the raceway 52 and a second side rail 62 located at the top of the second side wall 58 of the raceway 52. Each side rail 60, 62 includes an inwardly facing groove 72 and an upwardly extending latch 74 to enable the hanging box, the raceway cover and the faceplate adapter to be mounted to the raceway. The faceplate adapter 200 is mounted over the hanging box 100 and a portion of the raceway cover 78 so that the faceplate adapter 200 covers the hanging box 100 that is disposed within the raceway 52.

FIGS. 3-5 illustrate the hanging box 100 of the present invention being configured to receive two receptacles. The hanging box 100 includes an open top 102 defined by a top edge 104, a first side wall 106, a second side wall 108, a front wall 110, a back wall 112 and a stepped bottom wall 114. The stepped bottom wall 114 includes an upper portion 116 and a lower portion 118. The side walls 106 and 108, the front wall 110, the back wall 112 and the stepped bottom wall 114 define an interior or first compartment 120. Each side wall 106, 108 includes an opening 122, 124, respectively, located at the middle of the side walls 106, 108. The hanging box 100 also includes two arm extensions 126 and 128 that extend from the top edge 104 of the second side wall 108. The arm extensions 126 and 128 expand the width of the hanging box 100.

The hanging box 100 has three sets of bosses that are aligned with each other. The first set of bosses 134 are disposed within the first compartment 120 in the upper portion 116 of the bottom wall 114, the second set of bosses 136 are disposed at the opening 124 in the second side wall 108 at the lower portion 118 of the bottom wall 114 and the third set of bosses 138 are disposed within the arm extensions 126, 128 that extend from the second side wall 108. The bosses are designed to receive conventional fasteners, such as screws, to mount the receptacle(s) or the faceplate to the hanging box and the raceway.

A removable divider wall 140 is positioned between the second set of bosses 136 such that the removable divider wall 140 is disposed in the opening 124 in the second side wall 108 so as to fill the opening 124 in the second side wall 108. As a result, the removable divider wall 140 defines part of the first compartment 120 in the hanging box 100. The removable divider wall 140 also creates an exterior or second compartment 148 that is defined by the second side wall 108, the removable divider wall 140 and the arm extensions 126 and 128. The first compartment 120 and the second compartment 148 are each sized to house a receptacle. For example, as illustrated in the exploded view of the raceway system in FIG. 2, an electrical receptacle 240 is to be positioned in the first compartment 120 and a communication receptacle 260 is to be positioned in the second compartment 148.

Figure 25:
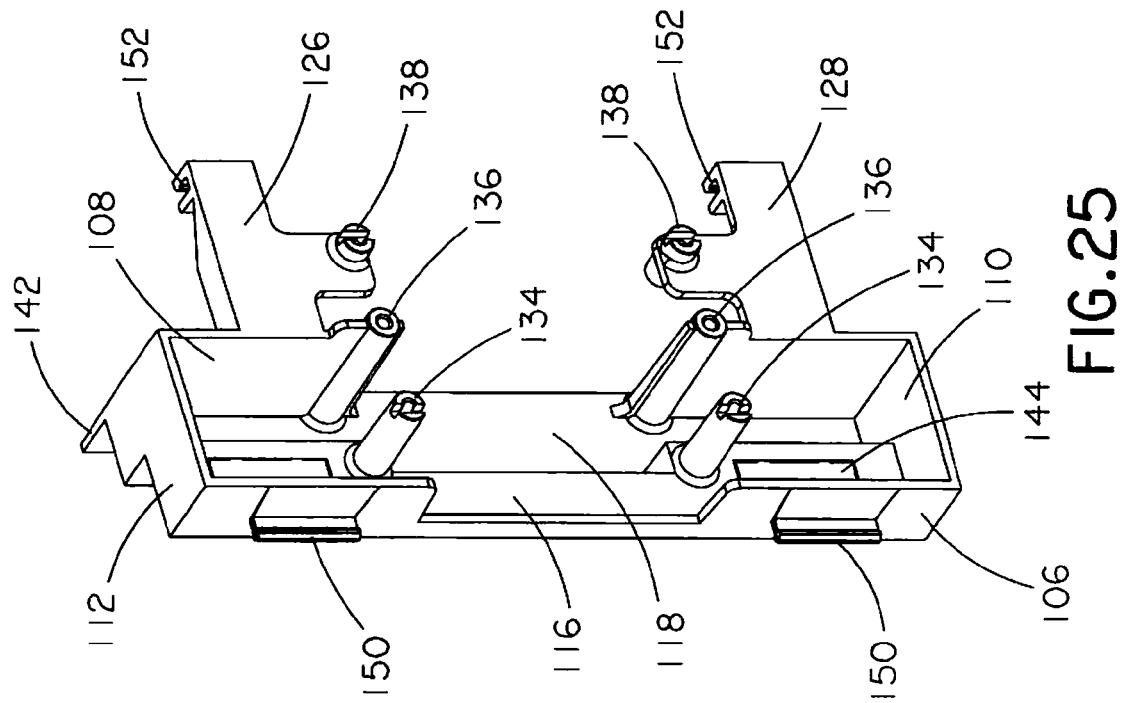
FIG. 25 is a top perspective view of the hanging box of the present invention with the divider wall detached.
Figure 24:
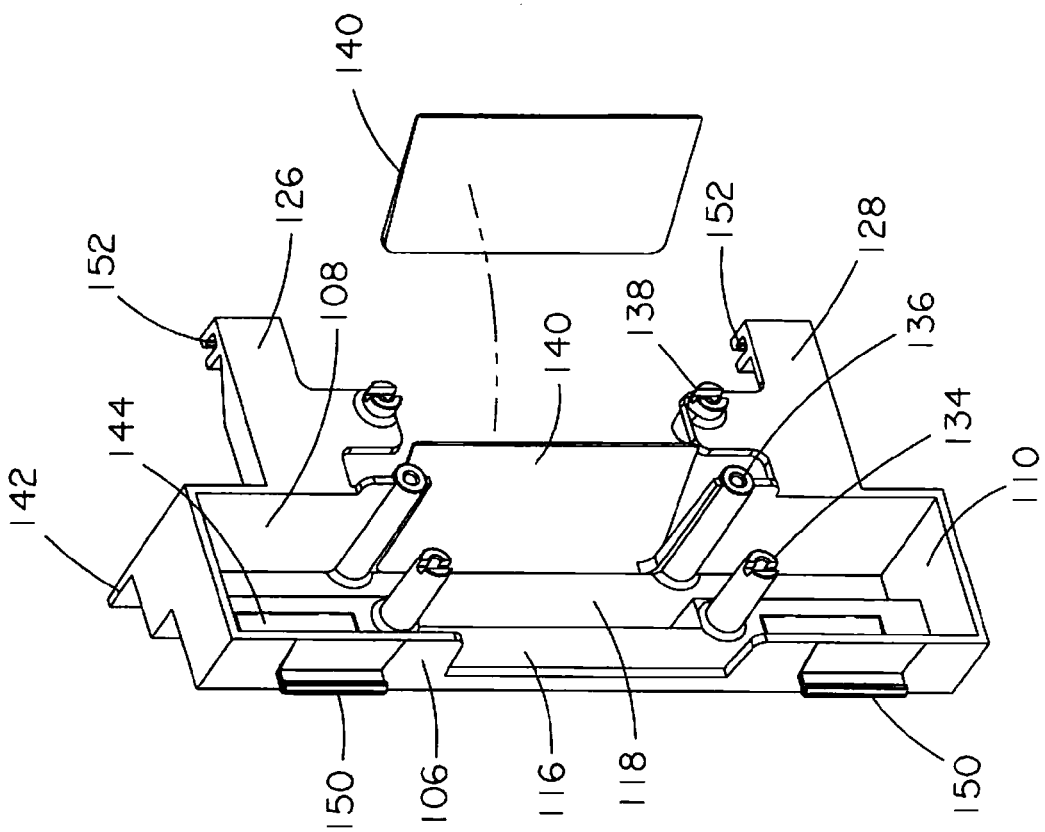
FIG. 24 is a top perspective view of the hanging box of the present invention with the divider wall being detached.

Additionally, the section between the hanging box 100 and the removable divider wall 140 is scored so that the divider wall 140 may be easily broken away and removed from the hanging box 100 (see FIGS. 24 and 25), if necessary, to accommodate the desired wiring configuration. As shown in FIGS. 24 and 25, when the divider wall 140 is removed from the hanging box 100, the first compartment 120 and the second compartment 148 become one compartment 160.

The hanging box 100 also includes a separation wall 142 that extends downward from the lower portion 118 of the bottom wall 114 such that the separation wall 142 is an extension of the second side wall 108. When the hanging box is mounted to the raceway, the separation wall 142 abuts the raceway divider walls 66 disposed adjacent to the hanging box. Thus, the separation wall 142 acts as the raceway divider wall by maintaining the division of the electrical power channel 68 and the communication channel 70 in the raceway 52.

The upper portion 116 of the bottom wall 114 includes at least one breakout section 144 that may be removed from the upper portion 116 of the bottom wall 114 leaving an opening 146 in the bottom wall 114. When the breakout section 144 is removed from the bottom wall 114 of the hanging box, wires may be routed from the raceway channel below the first compartment 120 to a receptacle mounted in the hanging box.

The second compartment 148 has an open bottom section so that when a receptacle is mounted in the second compartment 148 of the hanging box 100, the wires disposed within the channel below the second compartment may be connected to the receptacle. The separation wall 142 and the raceway divider walls 66 maintain the wires in one of the corresponding channels in the raceway 52.

Figure 11:
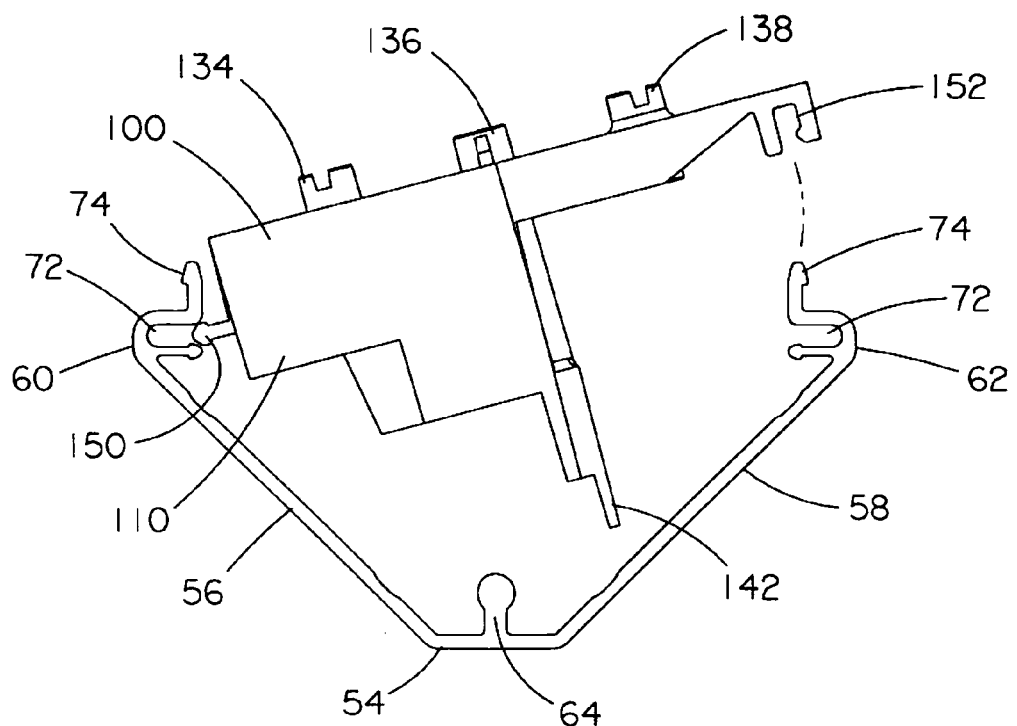
FIG. 11 is a front view of the hanging box of FIG. 3 as it is being installed in the raceway system.
Figure 12:
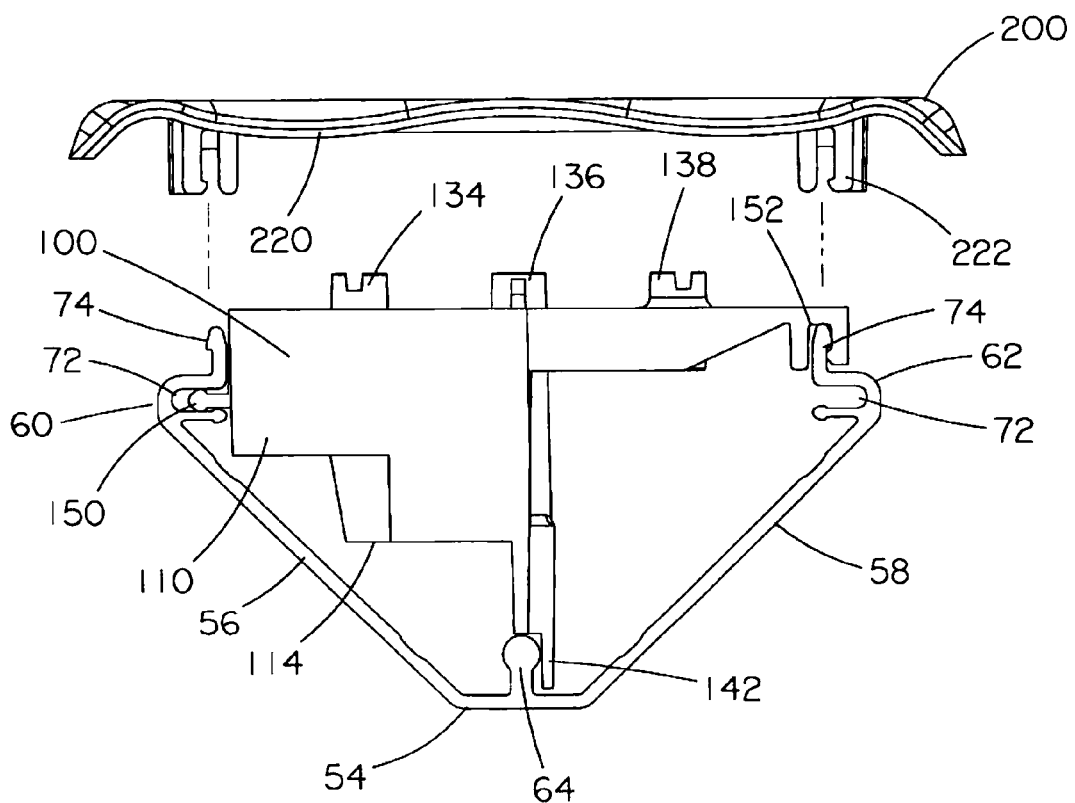
FIG. 12 is a front view of the hanging box installed in the raceway system of FIG. 11 and the faceplate adapter to be installed on the raceway system.

The hanging box 100 is secured to the raceway by latching elements. The first side wall 106 of the hanging box has latches 150 that extend outwardly therefrom. As shown in FIGS. 11 and 12, the latches 150 are sized to engage a groove 72 in the side rails 60, 62 of the raceway 52. As shown in FIG. 4, the bottom 130, 132 of each arm extension 126, 128, respectively, includes a groove 152 that is sized to receive one of the latches 74 that extends upwardly from the side rails 60, 62 of the raceway. The assembly of the hanging box into the raceway system will be described in more detail with respect to FIGS. 10-12.

Figure 9:
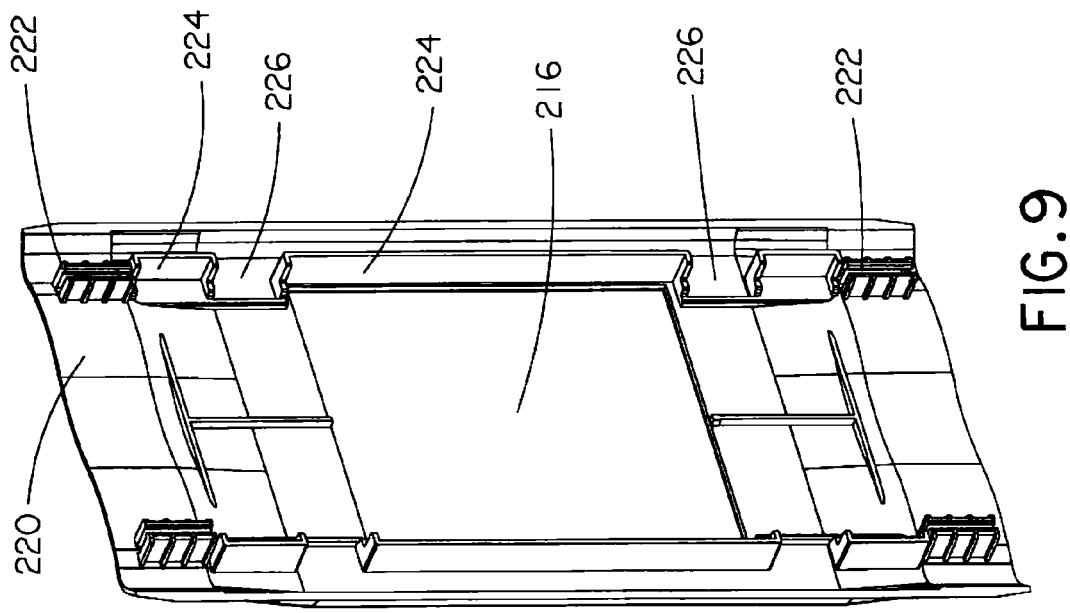
FIG. 9 is a bottom perspective view of the faceplate adapter of FIG. 8 with the entire center section detached.

FIGS. 6-9 illustrate the faceplate adapter 200 of the present invention. The universal faceplate adapter 200 can accommodate either a dual gang faceplate 84 or a single gang faceplate 90. The faceplate adapter 200 illustrated in FIGS. 6 and 7 is configured to receive a single gang faceplate 90 while the faceplate adapter 200 illustrated in FIG. 9 is configured to receive a dual gang faceplate 84.

Figure 8:
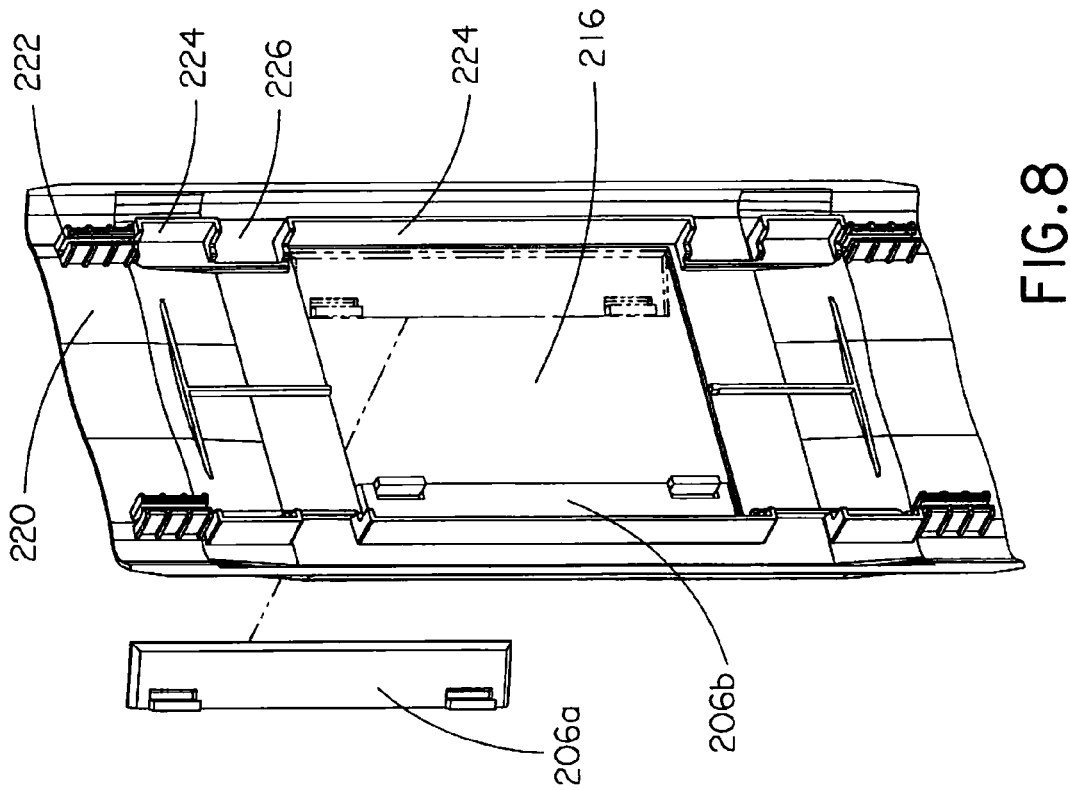
FIG. 8 is a bottom perspective view of the faceplate adapter of FIG. 7 with a portion of the center section being detached.

As discussed above, the faceplate adapter 200 is designed to be placed over a portion of the raceway cover 78 and to be placed over the hanging box 100 mounted in the raceway 52. The faceplate adapter 200 has a main body 202 with a removable center section 204 and a rectangular shaped aperture 216. The aperture 216 provides access to the receptacle(s) installed in the hanging box 100 mounted in the raceway 52. The center section 204 includes two members 206a and 206b each having an inner edge 208a, 208b and an outer edge 210a, 210b, respectively. The inner edge 208a, 208b of the members is removably attached to main body 202 adjacent to the aperture 216. As shown in FIG. 6, the area between the inner edge 208a, 208b of each member 206a, 206b and the main body 202 is scored. When the members 206a and 206b are detached from the faceplate adapter 200, as illustrated in FIGS. 8 and 9, the width of the aperture 216 increases. Each member 206a and 206b also includes at least one slot 212a, 212b, respectively, located near the outer edge 210a, 210b of the members 206a and 206b. Each member 206a and 206b also has at least one flange 214a, 214b, respectively, that extends downwardly from the outer edge 210a, 210b of the members 206a and 206b and is positioned adjacent to the at least one slot 212a, 212b.

The bottom 220 of the faceplate adapter 200 includes a plurality of notches 222 that are configured to receive the latch elements 74 that extend upwardly from the side rails 60, 62 of the raceway 52. The faceplate adapter 200 also includes guide walls 224 that extend downwardly from the bottom 220 of the faceplate adapter 200. A portion of the guide walls 224 surrounds the longitudinal sides of the aperture 216 so as to frame a portion of the hanging box 100 when the faceplate adapter 200 is installed over the hanging box 100 mounted to the raceway 52. The bottom 220 of the faceplate adapter 200 also includes a number of openings 226 adjacent to the guide wall 224. The openings 226 are sized to receive the hanging box arm extensions 126, 128 when the faceplate adapter 200 is positioned over the hanging box 100 and mounted to the raceway 52.

Figure 10:
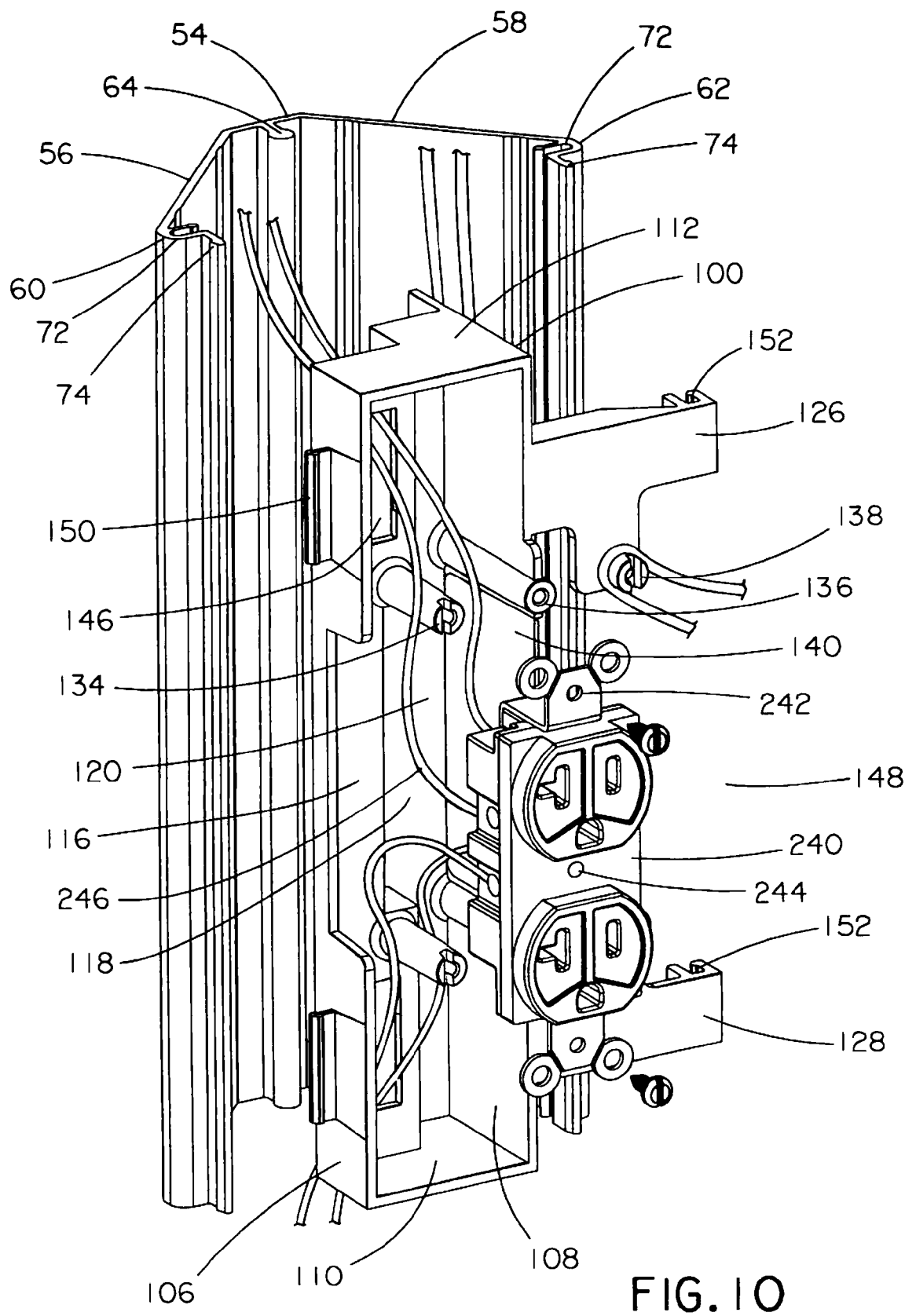
FIG. 10 is an exploded view of the hanging box and an electrical receptacle to be installed in the raceway system of FIG. 1.

FIG. 10 illustrates the hanging box 100 of the present invention and an electrical receptacle 240 with wires 246 to be positioned within the first compartment 120 of the hanging box 100 as they are being installed in the raceway 52. The wires 246 attached to the electrical receptacle 240 are routed through the opening 146 created by removing the breakout section 144 formed in the bottom wall 114 of the hanging box 100. The separator wall 142 prevents the wires 246 from entering the communication channel 70 thereby maintaining the electrical wires 246 in the electrical power channel 68 of the raceway.

FIGS. 11 and 12 illustrate the hanging box 100 and the faceplate adapter 200 being mounted to the cove raceway. As illustrated in FIG. 11, the hanging box 100 is initially tilted so that the latches 150 extending from the first side wall 106 may be inserted into the grooves 72 in the first side rail 60 of the raceway 52. Next, the hanging box 100 is pivoted downward so that the latches 150 are snapped into the grooves 72 and the separation wall 142 becomes aligned with the raceway divider walls 66 located at the front and back wall of the hanging box 100 to maintain the division of the channels in the raceway. As the latches 150 are being snapped into the grooves 72, the grooves 152 extending from the bottom 130, 132 of the arm extensions 126, 128 are secured to the latch elements 74 extending upwards from the second side rail 62 of the raceway 52.

FIG. 12 illustrates the hanging box 100 mounted in the raceway 52. Next, the faceplate adapter 200 is positioned such that the openings 226 are positioned over the arm extensions 126, 128 and the notches 222 engage a free portion of the latches 74 extending upwards from the first and second side rails 60, 62 of the raceway 52 to secure the faceplate adapter 200 to the raceway 52.

Figure 13:
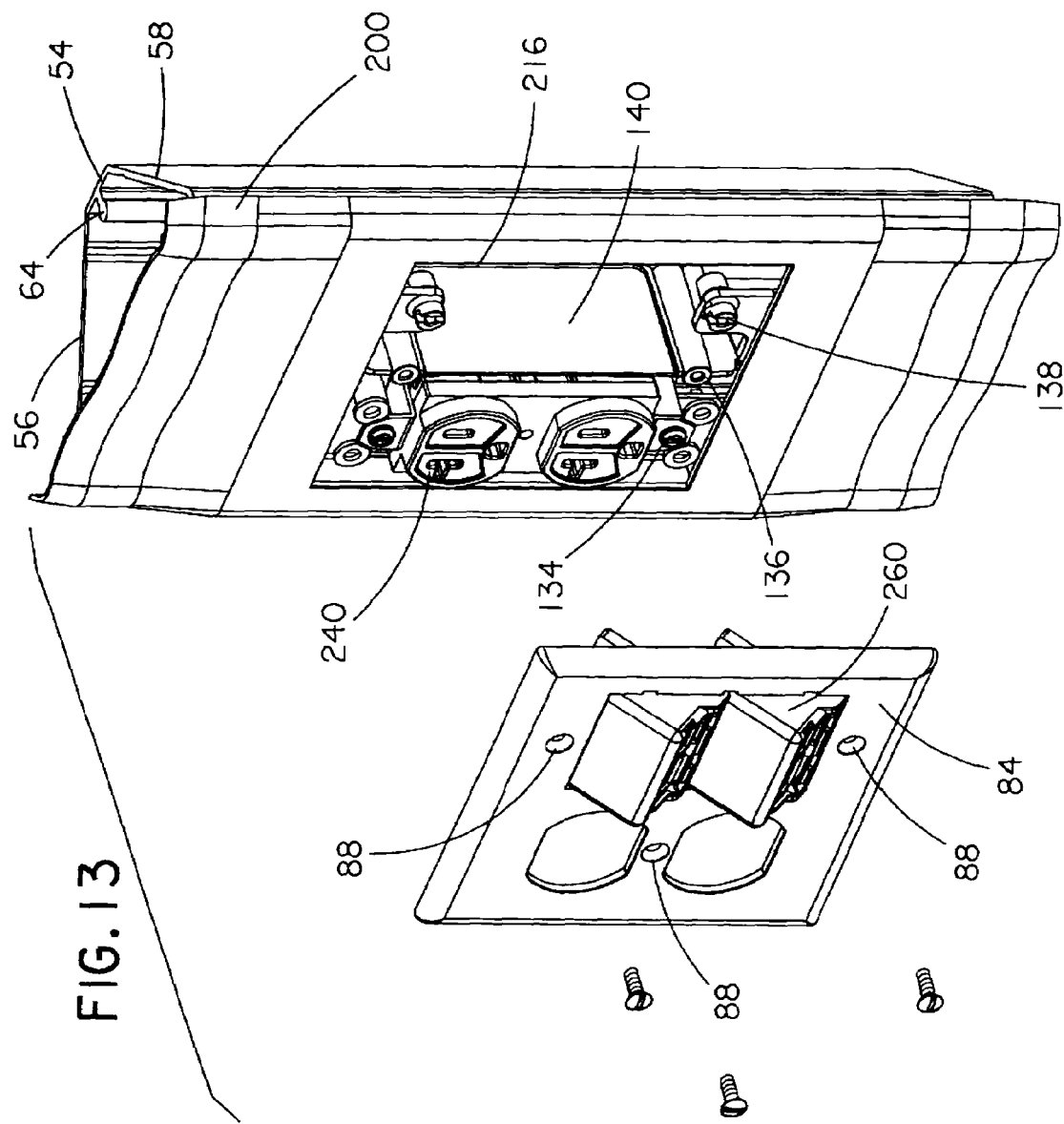
FIG. 13 is a partially exploded view of the dual gang faceplate and communication receptacle to be installed in the raceway system of FIG. 1.

As illustrated in FIG. 13, an electrical receptacle 240, hanging box 100 and faceplate adapter 200 have been installed in the raceway 52. The electrical receptacle 240 is secured to the first set of bosses 134 in the hanging box 100 by fasteners, such as a screw. The removable divider wall 140 remains positioned between the second set of bosses 136 so as to define the first compartment 120 and the second compartment 148 to accommodate an electrical receptacle and a communication receptacle in the hanging box. The members 206a, 206b of the center section 204 of the faceplate adapter 200 were detached from the main body 202 to accommodate the dual gang faceplate 84.

Figure 17:
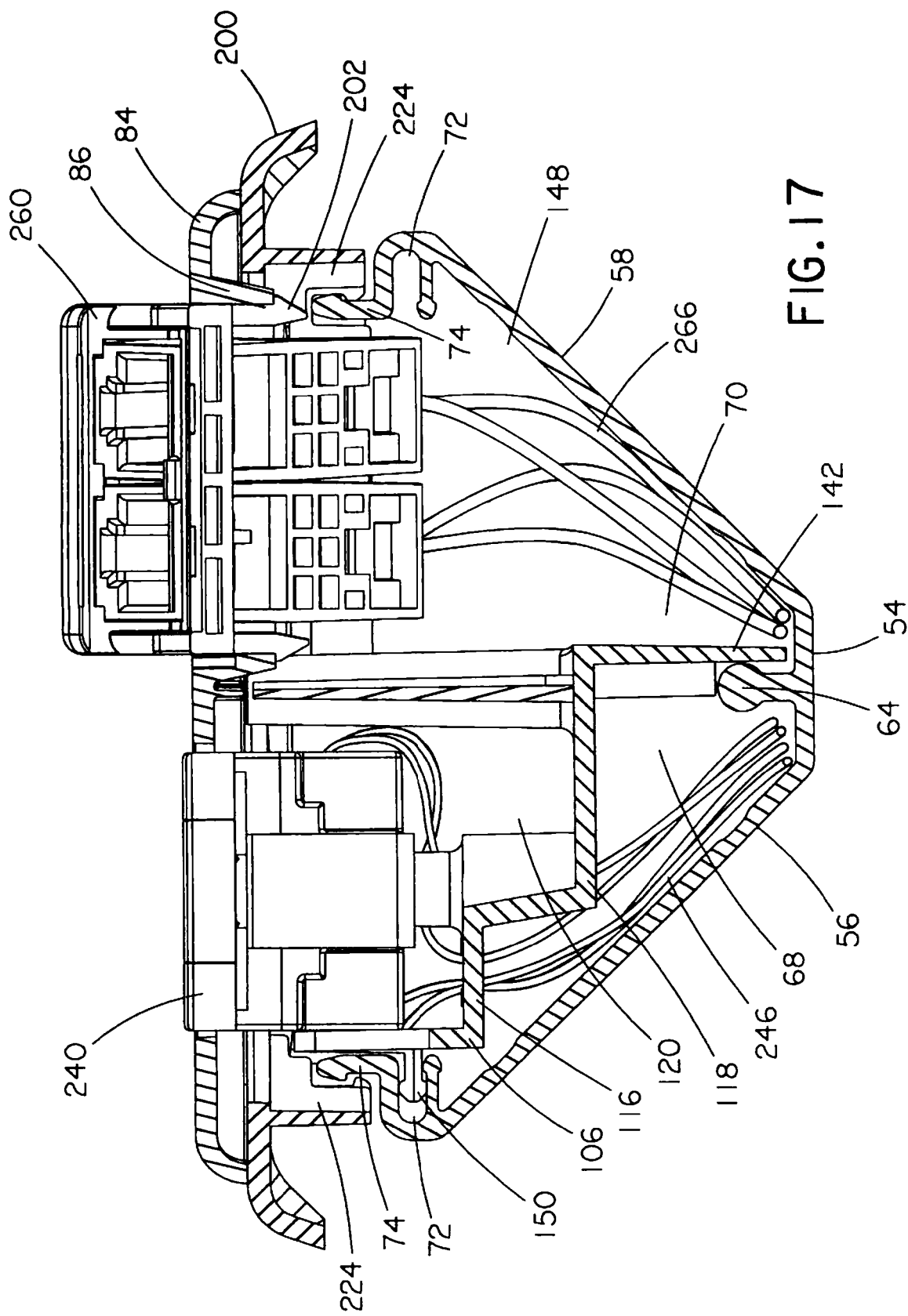
FIG. 17 is a front cross sectional view of the hanging box and faceplate adapter installed in the raceway system of FIG. 14 taken along line 17-17 of FIG. 14.
Figure 18:
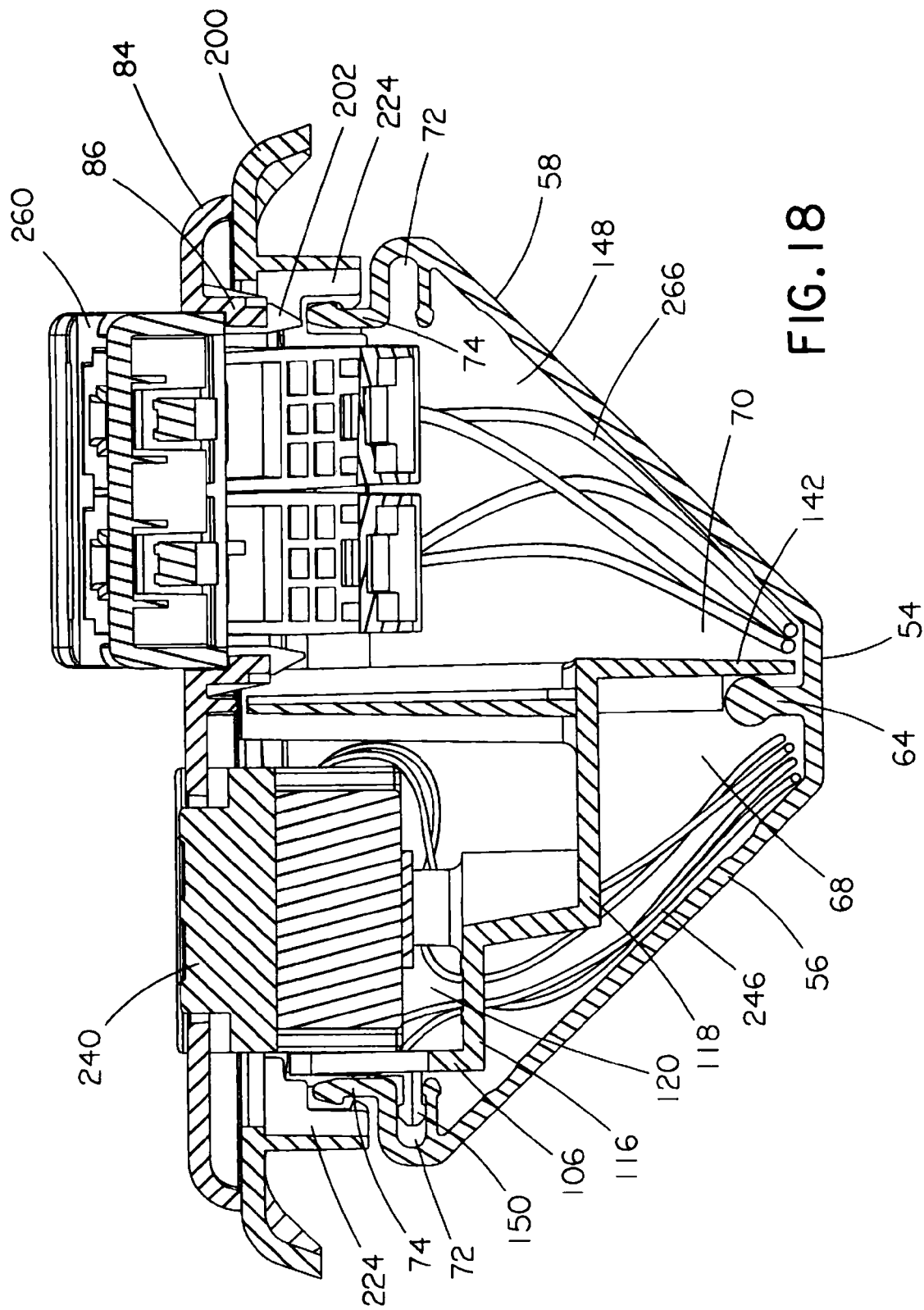
FIG. 18 is a front cross sectional view of the hanging box and faceplate adapter installed in the raceway system of FIG. 14 taken along line 18-18 of FIG. 14.
Figure 19:
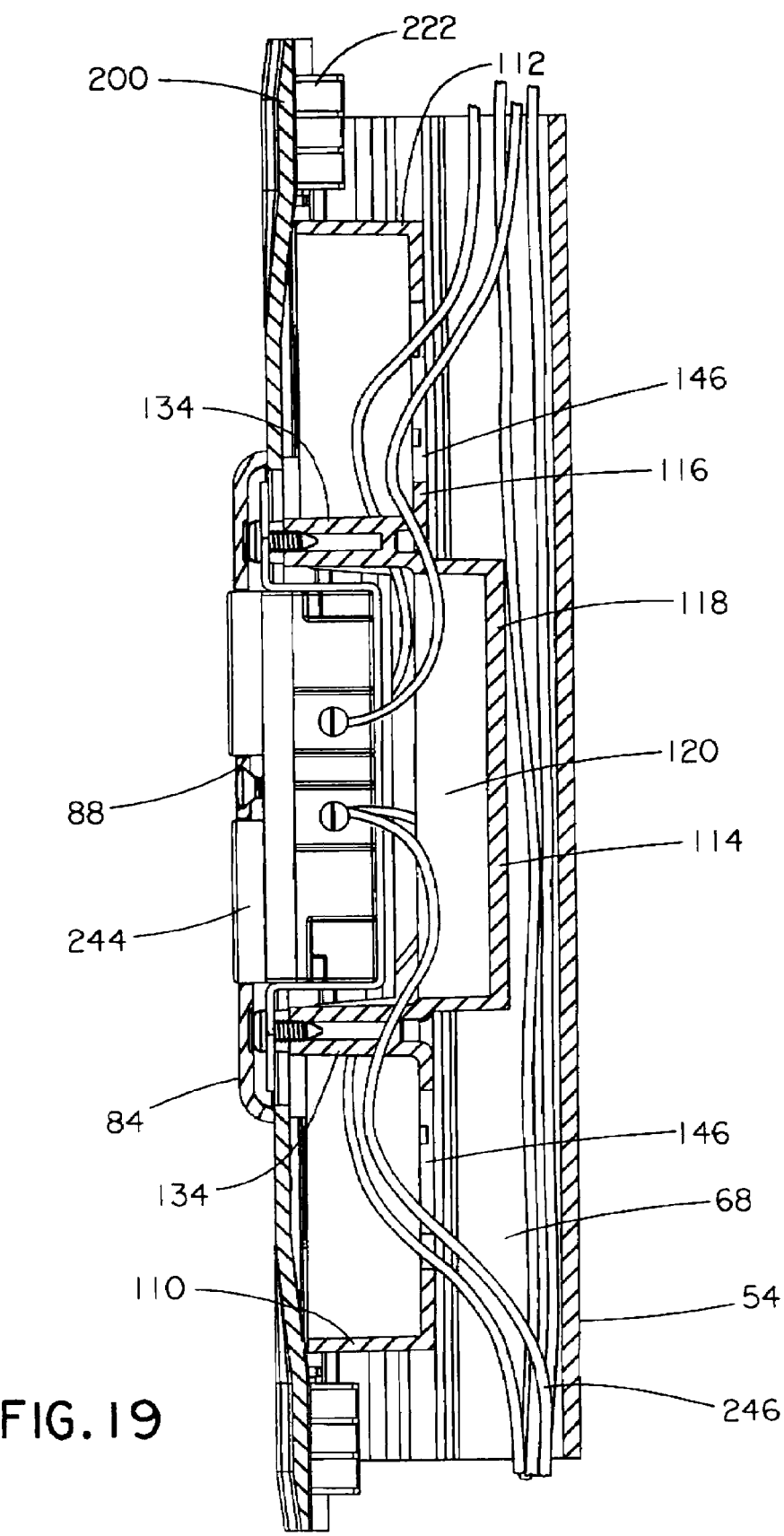
FIG. 19 is a side cross sectional view of the hanging box and faceplate adapter installed in the raceway system of FIG. 14 taken along line 19-19 of FIG. 14.
Figure 20:
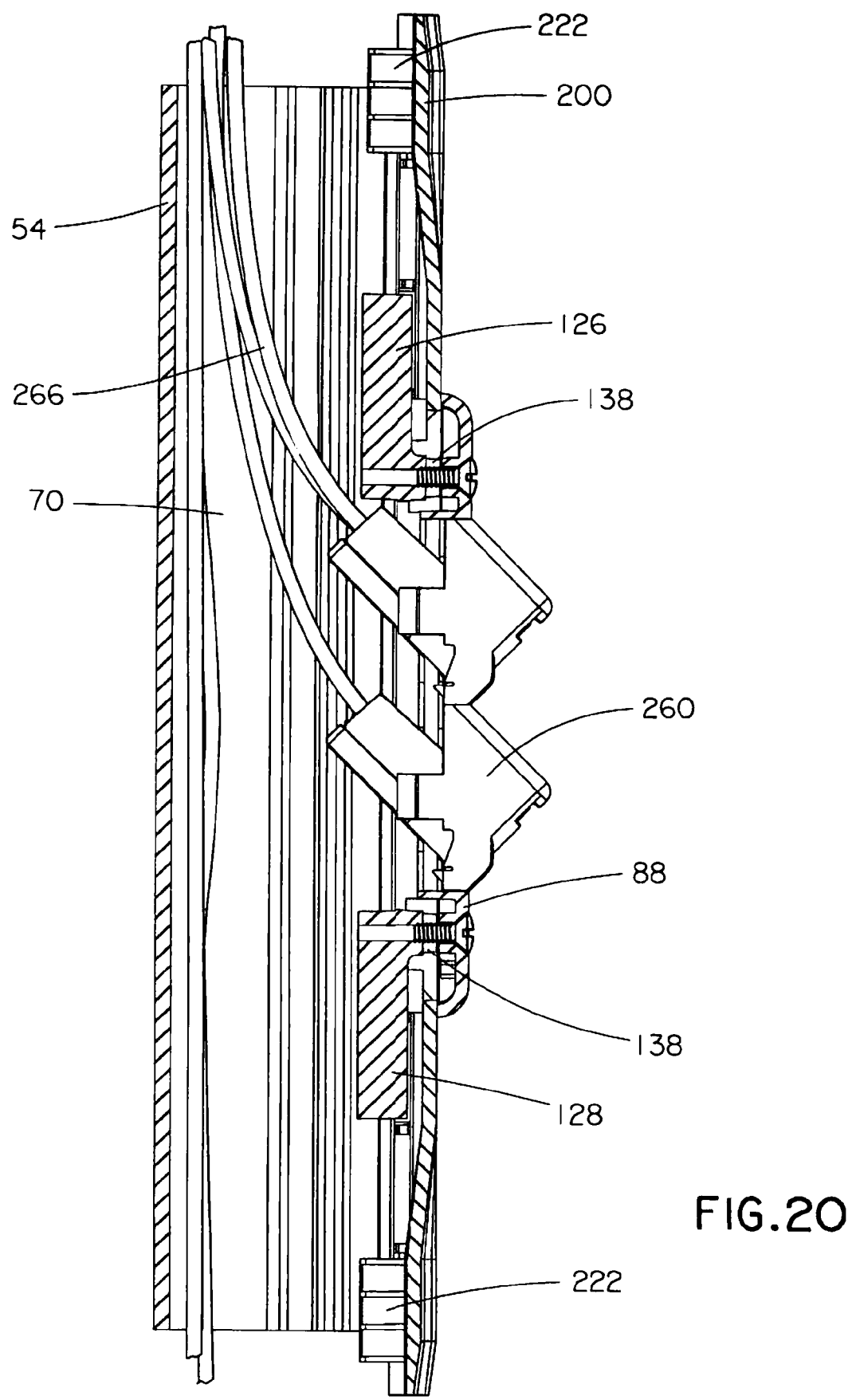
FIG. 20 is a side cross sectional view of the hanging box and faceplate adapter installed in the raceway system of FIG. 14 taken along line 20-20 of FIG. 14.
Figure 21:
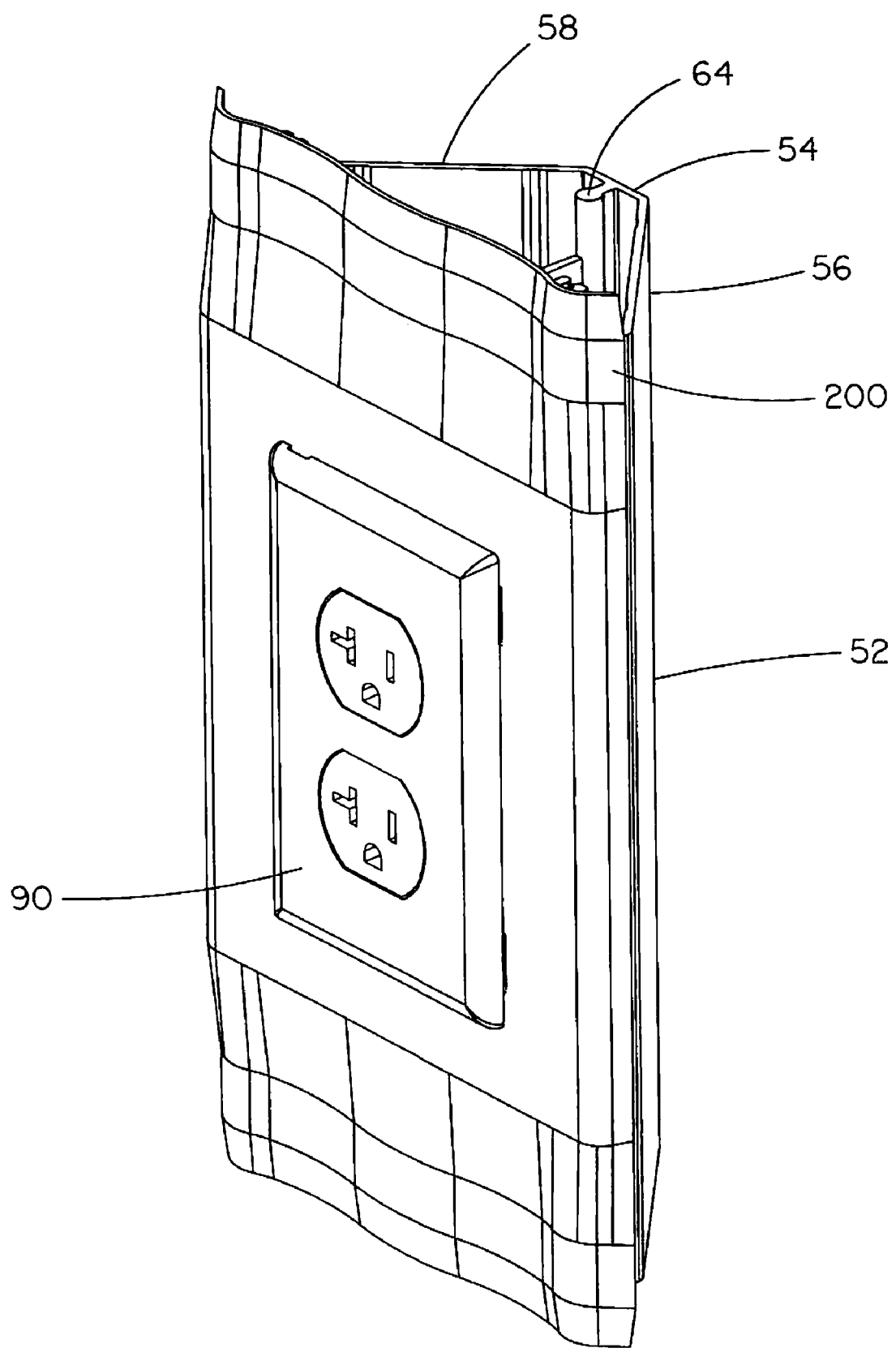
FIG. 21 is a top perspective view of a second embodiment of the hanging box and faceplate adapter of the present invention installed in a raceway system that is configured to house a single receptacle.

Before the dual gang faceplate 84 is mounted to the hanging box 100, the communication receptacle 260 is positioned within the dual gang faceplate 84 such that latches 262 extending from the communication receptacle 260 engage notches 86 in the dual gang faceplate securing the communication receptacle to the faceplate (see FIGS. 17 and 18). The communication receptacle 260 and the dual gang faceplate 84 can then be mounted to the hanging box 100. The dual gang faceplate 84 and attached communication receptacle 260 are positioned over the aperture 216 in the faceplate adapter 200 such that the communication receptacle 260 is disposed in the second compartment 148 of the hanging box 100. The wires 266 are routed from the communication channel 70 in the raceway 52 to the communication receptacle 260. Additionally, the attachment holes 88 in the dual gang faceplate are aligned with the third set of bosses 138 and an attachment hole 244 in the electrical receptacle 240. Fasteners, such as screws, secure the faceplate to the third set of bosses 138 and the electrical receptacle 240 disposed in the hanging box 100.

Figure 14:
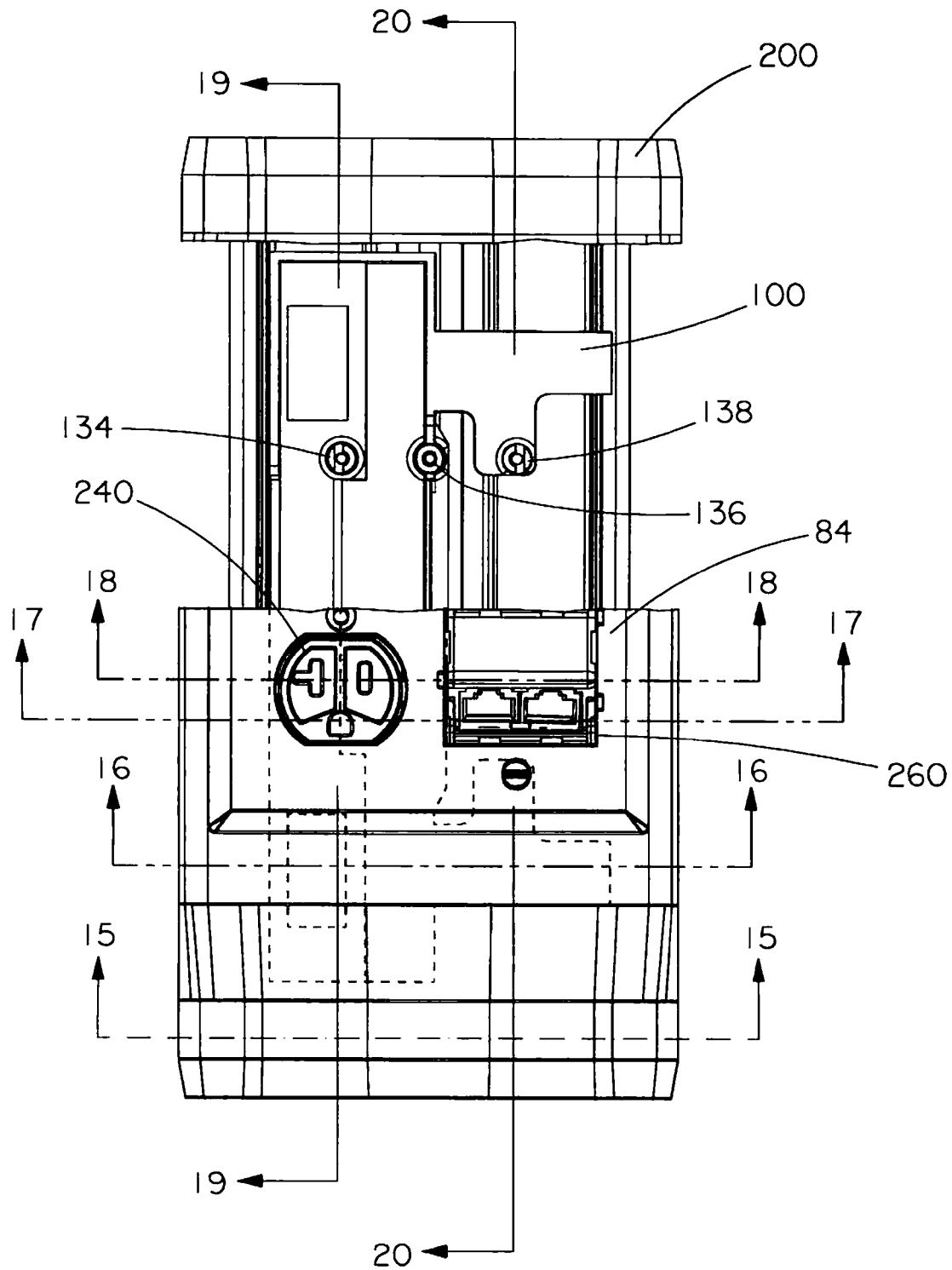
FIG. 14 is a cut away top plan view of the hanging box and faceplate adapter installed in the raceway system of FIG. 1.
Figure 15:
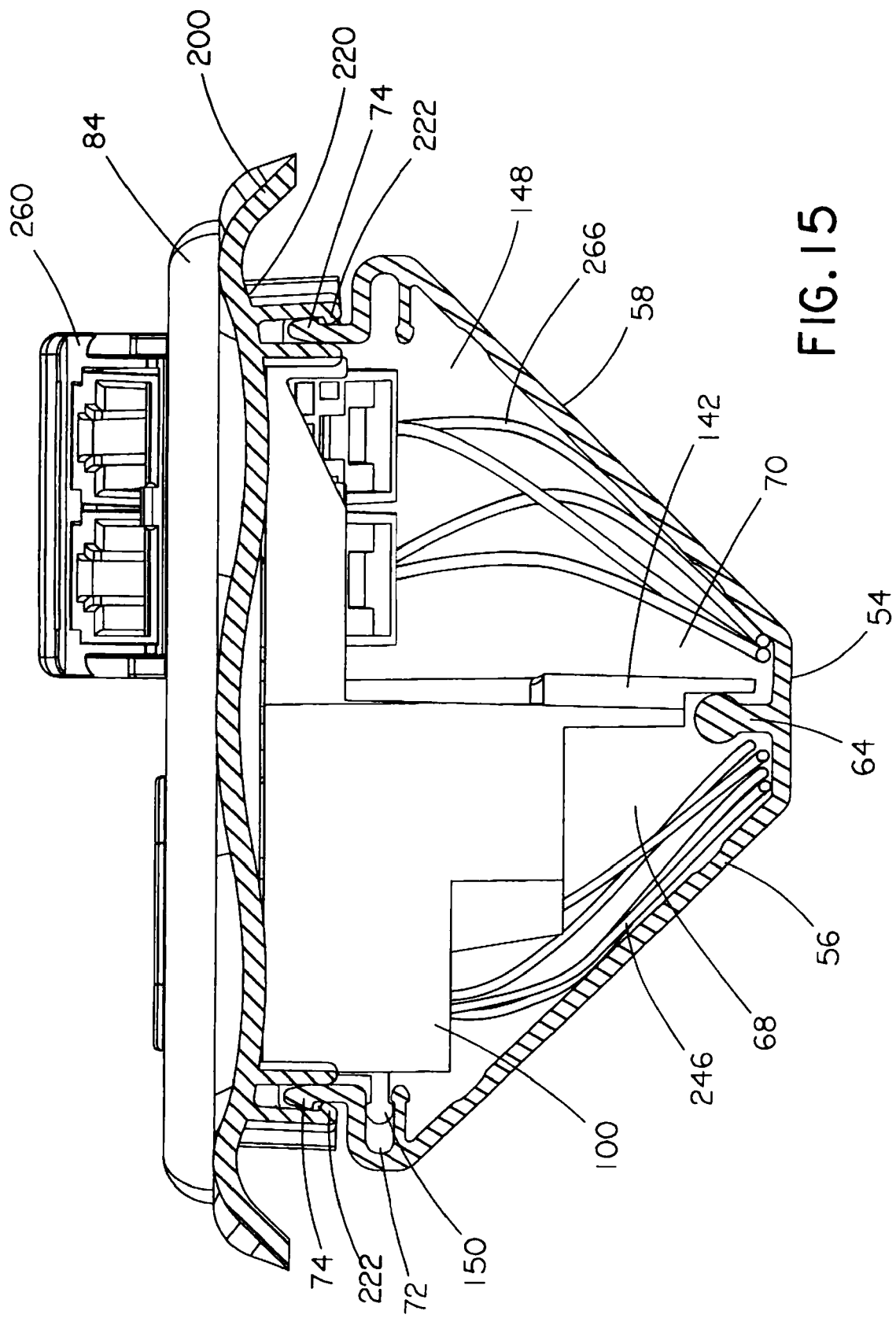
FIG. 15 is a front cross sectional view of the hanging box and faceplate adapter installed in the raceway system of FIG. 14 taken along line 15-15 of FIG. 14.

FIG. 14 is a partial cut away view of the assembled raceway system with the hanging box and faceplate adapter configured to receive two receptacles. FIGS. 15-20 are cross sectional views of the assembled raceway system with the hanging box and the faceplate adapter configured to receive two receptacles. FIG. 15 illustrates the connection between the faceplate adapter 200 and the raceway 52 with the hanging box 100 disposed in the raceway 52. As previously discussed, the faceplate adapter 200 is positioned over the hanging box and the raceway such that the notches 222 extending from the faceplate adapter 200 engage the latches 74 extending upwards from the sidewalls of the raceway 52.

Figure 16:
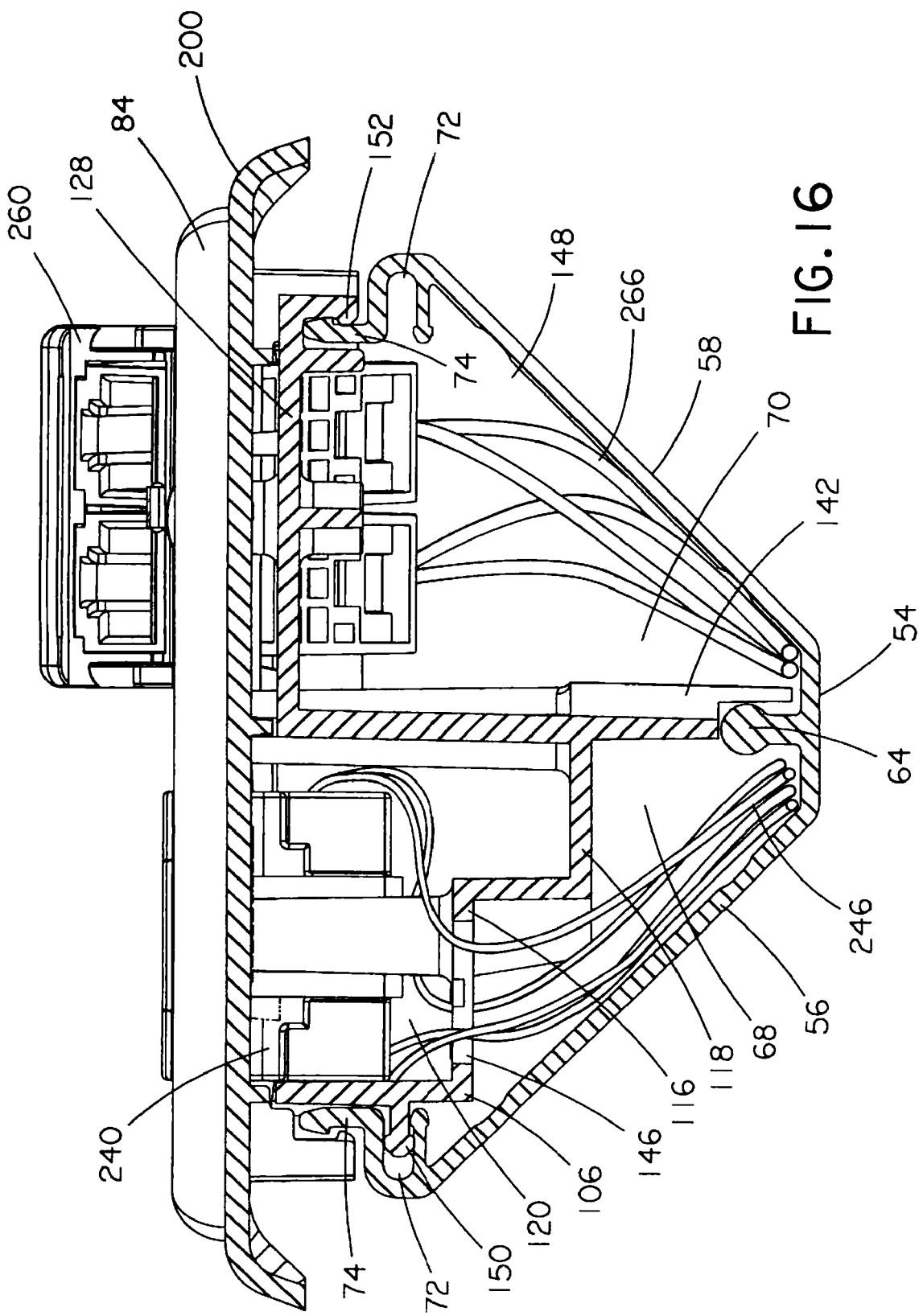
FIG. 16 is a front cross sectional view of the hanging box and faceplate adapter installed in the raceway system of FIG. 14 taken along line 16-16 of FIG. 14.

FIG. 16 illustrates the connection between the hanging box and the raceway with the faceplate adapter positioned over the hanging box. As previously discussed, the latch 150 extending from the first side wall 106 of the hanging box 100 engages the groove 72 in the raceway sidewall and the grooves 152 extending from the arm extensions 126, 128 engage the latch 74 extending from the raceway sidewall to mount the hanging box to the raceway.

FIGS. 15-20 also illustrate the separation wall 140 maintaining the division of the channels in the raceway so that the wires 246 from the electrical power channel 68 are connected to the electrical receptacle 240 and the wires 266 from the communication channel 70 are connected to the communication receptacle 260.

Alternatively, if desired, two electrical receptacles may be positioned side by side in the hanging box. In order to accommodate two electrical receptacles in the hanging box, the divider wall 140 is removed to create a large compartment to enable the wires 246 to be connected to the electrical receptacles 240. Since the removal of the divider wall 140 provides access to the channel below the arm extensions 126, 128 when the hanging box 100 is mounted to the raceway 52, the hanging box 100 would be mounted to the raceway 52 such that the arm extensions 126, 128 are positioned over the electrical power channel 68 and the stepped bottom wall 114 is positioned above the communication channel 70. The breakout sections 144 would remain intact to ensure discrete channel separation for power and communication. One electrical receptacle would be mounted to the first set of bosses 134, the second electrical receptacle would be mounted to the third set of bosses 138 and the wires 246 in the electrical power channel 68 would be connected to each of the electrical receptacles. A faceplate designed to accommodate two electrical receptacles (not shown) would be positioned over the aperture 216 of the faceplate adapter 200 such that the holes in the faceplate become aligned with the holes in the electrical receptacles.

As discussed above, FIG. 21 illustrates a second embodiment of the universal hanging box 100 and the universal faceplate adapter 200 of the present invention being installed in a raceway system 50 and configured to receive a single receptacle. Since the area between the second side wall 108 and the removable divider wall 140 is scored, the divider wall 140 may be easily broken away from the hanging box 100. As shown in FIGS. 22, 24 and 25, the divider wall 140 has been detached and at least partially removed from the hanging box 100 thereby creating one large compartment 160 that may house a single receptacle.

As shown in FIG. 22, the members 206a, 206b of the center section 204 remain attached to the main body 202 of the faceplate adapter 200. Thus, the aperture 216 in the main body 202 of the faceplate adapter 200 is sized to provide access to a single receptacle when the faceplate adapter 200 is positioned over the hanging box 100. As discussed with respect to FIGS. 6 and 7, the members 206a, 206b of the center section 204 include at least one slot 212a, 212b and at least one adjacent flange 214a, 214b.

FIGS. 22 and 23 illustrate the single gang faceplate 90 that is to be mounted over the faceplate adapter. The bottom 92 of the single gang faceplate has a plurality of notches 96 that extend downwards from the outer edge 94 of the faceplate 90. The notches 96 engage part of the members 206a, 206b between each slot 212a, 212b and adjacent flange 214a, 214b such that the flange 214a, 214b is disposed within one of the notches 96. The single gang faceplate 90 covers the aperture 216 in the faceplate adapter 200.

Figure 26:
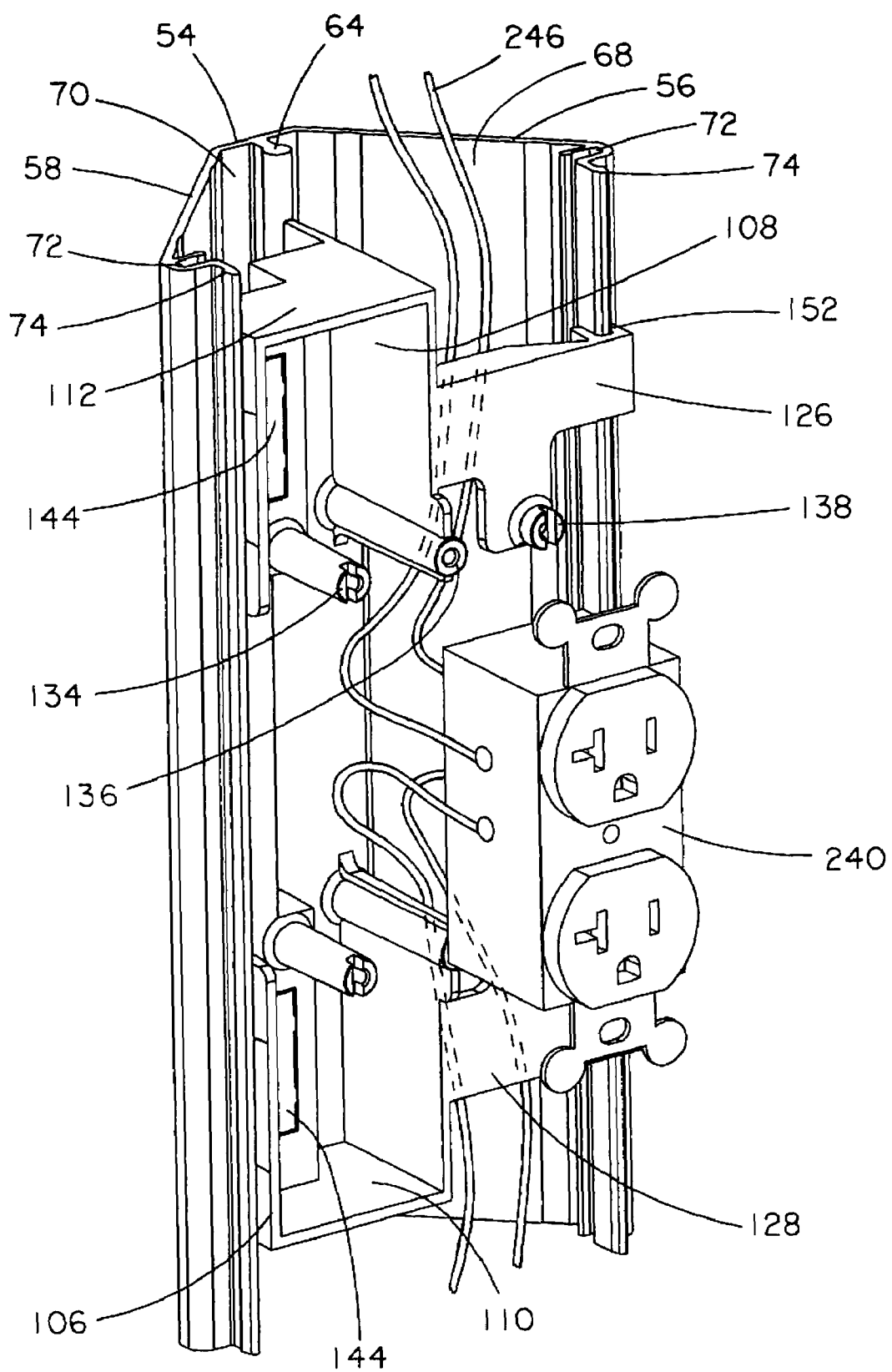
FIG. 26 is a perspective view of the hanging box and a single receptacle to be installed in the hanging box of the raceway system of FIG. 21.

As shown in FIG. 26, the hanging box of the present embodiment is secured to the raceway in the same manner as discussed above with respect to FIGS. 10-12 that illustrate the installation of the hanging box configured to receive two receptacles. However, since the divider wall is removed thereby providing access to the channel below the arm extensions 126, 128 when the hanging box 100 is mounted to the raceway 52, the hanging box 100 would be mounted to the raceway 52 such that the arm extensions 126, 128 are positioned over the electrical power channel 68 and the stepped bottom wall 114 is positioned above the communication channel 70. The breakout sections 144 would remain intact to ensure discrete channel separation for power and communication. Alternatively, if it is desirable to install a single communication receptacle in the raceway, the hanging box would be mounted with the arm extensions positioned over the communication channel and the stepped bottom wall positioned over the electrical power channel.

The hanging box is initially tilted so that the latches 150 engage the grooves. The hanging box is then pivoted downward so that the latches 150 are snapped into the groove 72 and the grooves 152 are secured to the latches 74. Once the hanging box is installed, the separation wall maintains the division of the channels in the raceways. Next, the electrical receptacle is positioned in the center of the hanging box and is secured to the second set of bosses. The wires from the electrical channel are routed from the channel through the opening to the electrical receptacle (see FIGS. 28-30).

Figure 27:
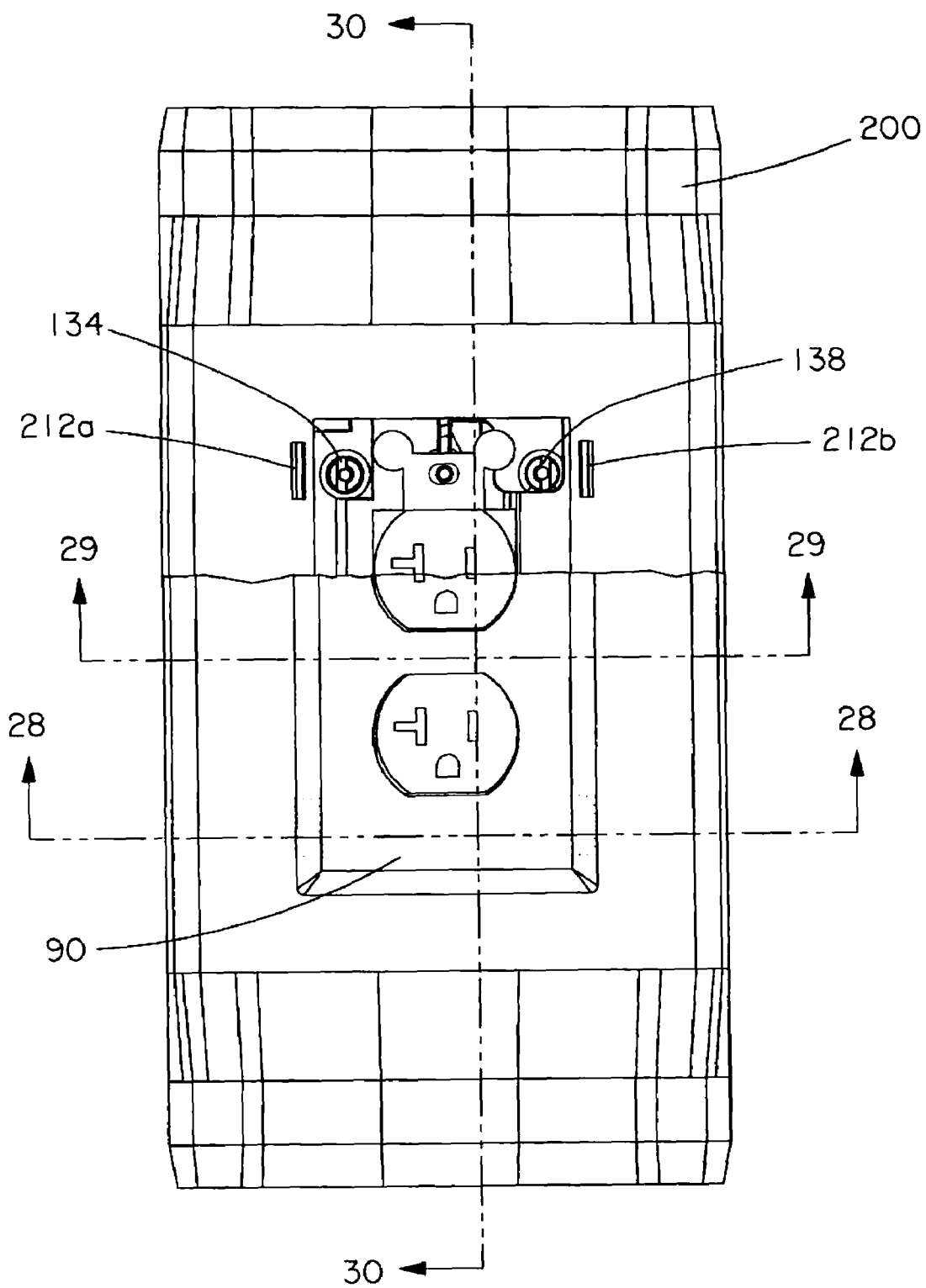
FIG. 27 is a cut away top plan view of the hanging box and faceplate adapter installed in the raceway system of FIG. 21.
Figure 28:
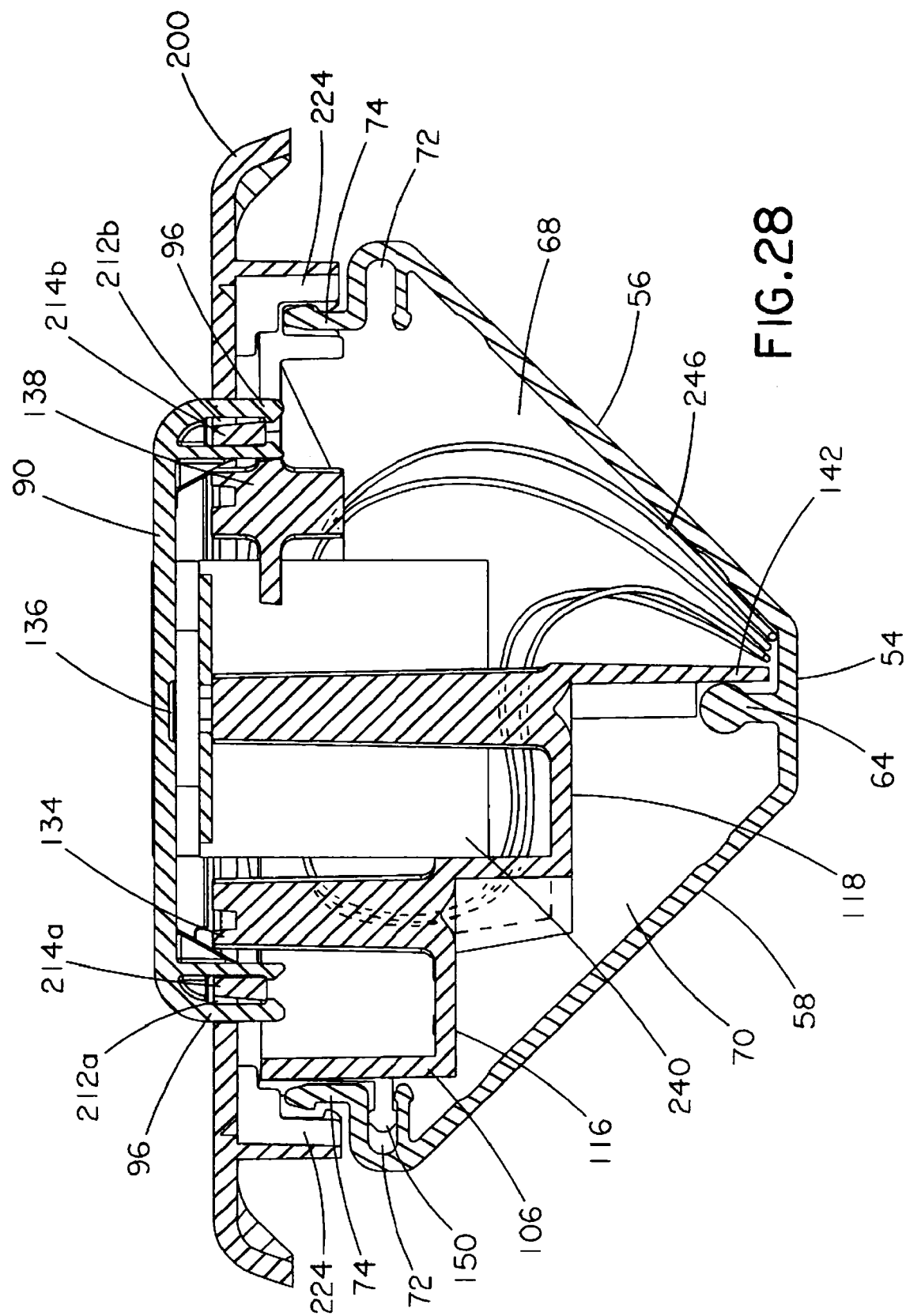
FIG. 28 is a rear cross sectional view of the hanging box and faceplate adapter installed in the raceway system of FIG. 27 taken along line 28-28 of FIG. 27.
Figure 29:
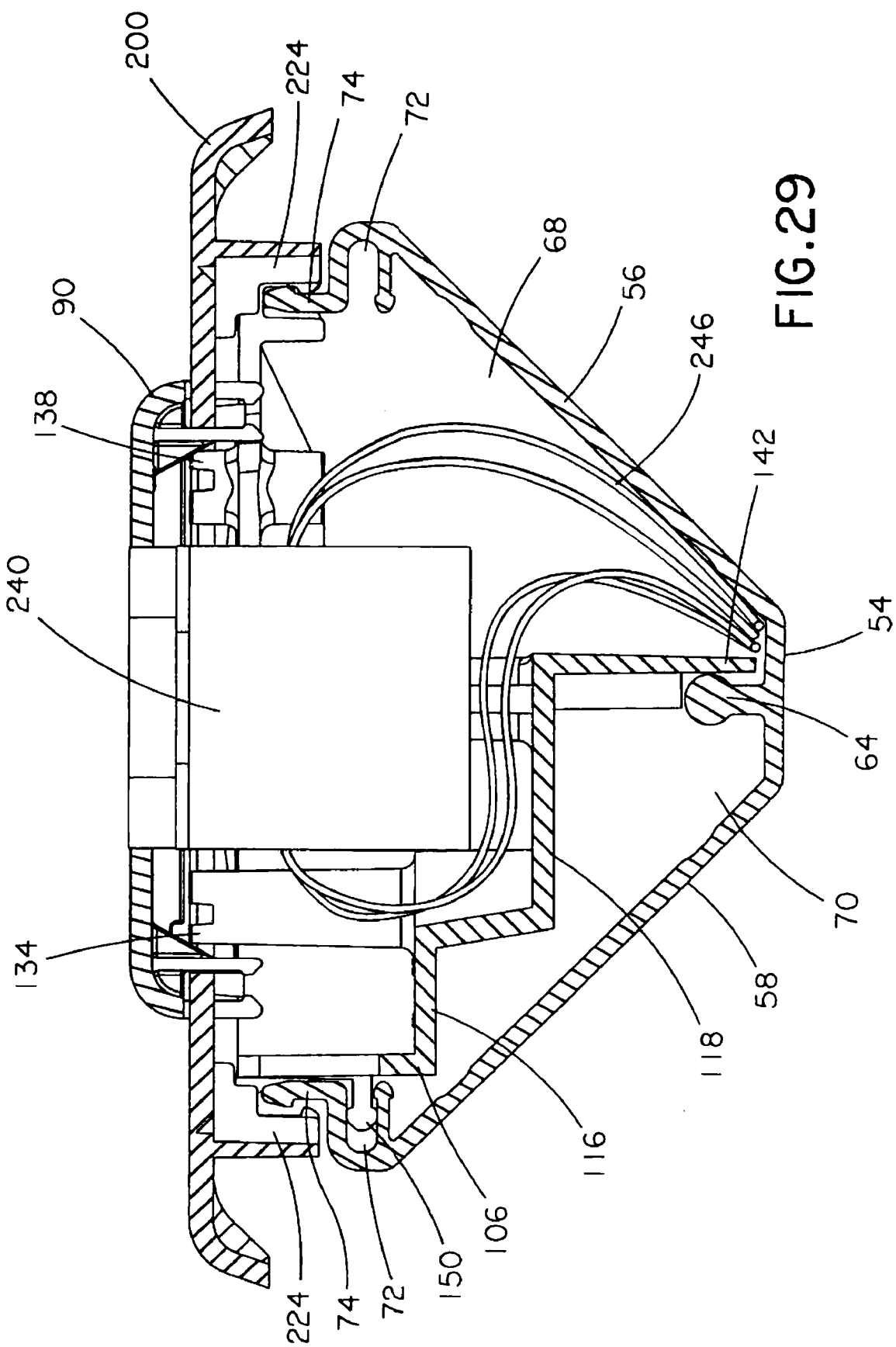
FIG. 29 is a rear cross sectional view of the hanging box and faceplate adapter installed in the raceway system of FIG. 27 taken along line 29-29 of FIG. 27.
Figure 30:
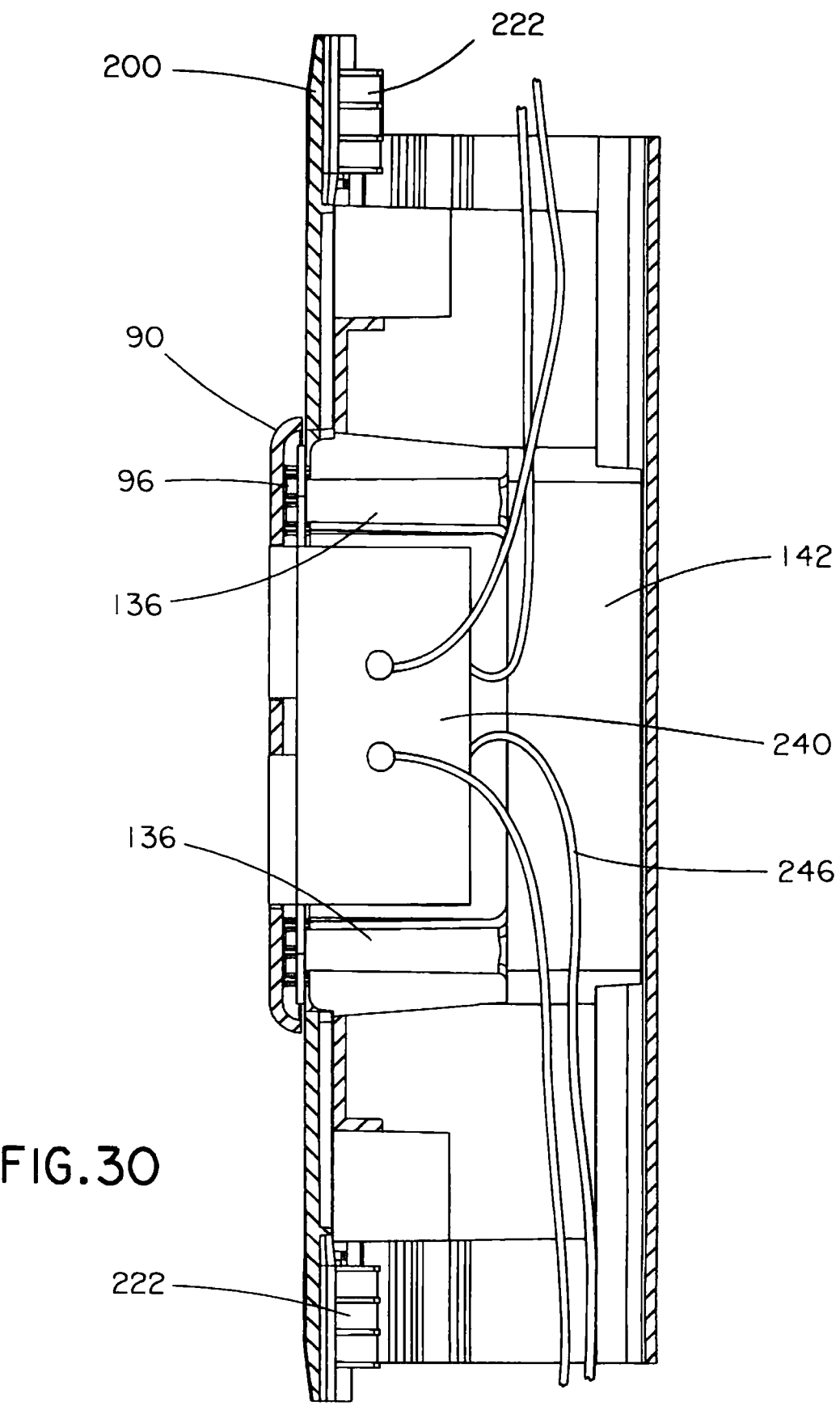
FIG. 30 is a side cross sectional view of the hanging box and faceplate adapter installed in the raceway system of FIG. 27 taken along line 30-30 of FIG. 27.

FIG. 27 is a partial cut away view of the assembled raceway system with a hanging box and faceplate adapter configured to receive a single receptacle. FIGS. 28-30 are cross sectional views of the assembled raceway system with the hanging box and the faceplate adapter configured to receive a single receptacle. FIG. 28 illustrates the connection between the faceplate and the faceplate adapter. As discussed above, the notches extending from the bottom of the faceplate receive the flanges 214a, 214b extending from the members 206a, 206b such that a portion of each notch is disposed in the slot 210a, 210b and the aperture 216. FIGS. 28-30 also illustrate the separation wall 142 maintaining channel separation in the raceway so that the wires remain in either the electrical power channel or the communication channel.

The versatile device of the present invention enables a user to easily alter the number and location of power and communication outlets throughout the raceway system. The versatile device may accommodate any combination of a single or dual, electrical or communication receptacle. Additionally, even though the versatile device was illustrated in with a cove raceway, the device may also be installed in other types of raceways, such as a U-shaped raceway.

Thus, while the particular preferred embodiments of the present invention have been shown and described, it will be obvious to those skilled in the art that changes and modifications may be made without departing from the teaching of the invention. The matter set forth in the foregoing description and accompanying drawings is offered by way of illustration only and not as limitation. The actual scope of the invention is intended to be defined in the following claims when viewed in their proper perspective based on the prior art.

The invention claimed is:

1. A device for enabling at least one receptacle to be installed in a raceway system, the device comprising:

a hanging box adapted to be secured to the raceway system, the hanging box having a compartment for housing at least one receptacle and a removable divider wall positioned within the compartment for dividing the compartment to house two receptacles; and a faceplate adapter positioned over the hanging box and adapted to be secured to the raceway system, the faceplate adapter having a main body with an aperture for providing access to the hanging box, the main body having a removable section, wherein the removable section is removed from the faceplate adapter to define a dual receptacle faceplate aperture.

2. The device of claim 1, wherein the hanging box has a plurality of bosses for receiving a fastener to secure the at least one receptacle to the hanging box.

3. The device of claim 1. wherein the removable divider wall separates the compartment into a first compartment and a second compartment.

4. The device of claim 3, wherein the hanging box having a plurality of bosses with at least one boss being positioned in the first compartment and at least one boss being positioned in the second compartment.

5. The device of claim 4, wherein the hanging box further having at least one boss positioned adjacent to the removable divider wall.

6. The device of claim 1, wherein the hanging box having a separation wall extending downwardly from the hanging box towards the raceway system.

7. The device of claim 1, wherein the hanging box having latch elements for engaging the raceway system.

8. A raceway system comprising:

a raceway having a base, a first side wall extending upwardly from the base, a second side wall extending upwardly from the base and a divider wall positioned between the first side wall and the second side wall and extending upwardly from the base;

a hanging box mounted in the raceway between the first side wall and the second side wall, the hanging box having a compartment for housing at least one receptacle and a removable divider wall positioned within the compartment for dividing the compartment to house two receptacles;

a faceplate adapter positioned over the hanging box and mounted to the raceway, the faceplate adapter having a main body with an aperture for providing access to the hanging box, the main body having a removable section being removed from the faceplate adapter to define an enlarged aperture for receiving a dual receptacle faceplate; and a faceplate mounted to the faceplate adapter for covering the at least one receptacle housed in the hanging box.

9. The raceway system of claim 8, wherein the hanging box has a plurality of bosses for receiving a fastener to secure the at least one receptacle to the hanging box.

10. The raceway system of claim 8, wherein the removable divider wall separates the compartment into a first compartment and a second compartment.

11. The raceway system of claim 10, wherein the hanging box having a plurality of bosses with at least one boss being positioned in the first compartment and at least one boss being positioned in the second compartment.

12. The raceway system of claim 11, wherein the hanging box further having at least one boss positioned adjacent to the removable divider wall.

13. The raceway system of claim 8, wherein the hanging box having a separation wall extending downwardly tram the hanging box towards the base in the raceway, the separation wall abuts the raceway divider wall.

14. The raceway system of claim 8, wherein the hanging box having latch elements for engaging the first and second side wall of the raceway.

* * * * *

UNITED STATES PATENT AND TRADEMARK OFFICE
CERTIFICATE OF CORRECTION

| | |
|---|---|
| PATENT NO. | : 7,390,977 B2 |
| APPLICATION NO. | : 11/530523 |
| DATED | : June 24, 2008 |
| INVENTOR(S) | : Raymond M. Hill |

It is certified that error appears in the above-identified patent and that said Letters Patent is hereby corrected as shown below:

Claim 13, Column 10, line 30 which reads "box having a separation wall extending downwardly tram the" should read --box having a separation wall extending downwardly from the--

Signed and Sealed this

Twenty-first Day of October, 2008

JON W. DUDAS
*Director of the United States Patent and Trademark Office*